(12) United States Patent
Friend et al.

(10) Patent No.: US 9,864,612 B2
(45) Date of Patent: Jan. 9, 2018

(54) TECHNIQUES TO CUSTOMIZE A USER INTERFACE FOR DIFFERENT DISPLAYS

(75) Inventors: Joseph Friend, Bothell, WA (US);
Nathan Fish, Redmond, WA (US);
Jeffrey Berg, Seattle, WA (US);
Joo-Young Lee, Redmond, WA (US);
Derek Hans, Redmond, WA (US);
Kuldeep Karnawat, Redmond, WA (US); Jeremy Santy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/978,308

(22) Filed: Dec. 23, 2010

(65) Prior Publication Data

US 2012/0166985 A1    Jun. 28, 2012

(51) Int. Cl.
*G06F 3/048* (2013.01)
*G06F 9/44* (2006.01)

(52) U.S. Cl.
CPC .................................. *G06F 9/4448* (2013.01)

(58) Field of Classification Search
CPC ...... G06F 9/4443; G06F 3/1438; G06F 3/048; G06F 9/0448
USPC .................................................. 715/765, 761
See application file for complete search history.

(56) References Cited

U.S. PATENT DOCUMENTS

| 4,540,850 A | 9/1985 | Herr et al. |
| 4,831,552 A | 5/1989 | Scully et al. |
| 5,297,250 A | 3/1994 | Leroy et al. |
| 5,337,407 A | 8/1994 | Bates et al. |
| 5,339,389 A | 8/1994 | Bates et al. |
| 5,495,269 A | 2/1996 | Elrod et al. |
| 5,566,291 A | 10/1996 | Boulton et al. |
| 5,675,752 A | 10/1997 | Scott et al. |
| 5,704,029 A | 12/1997 | Wright, Jr. |

(Continued)

FOREIGN PATENT DOCUMENTS

| CN | 1551567 | 12/2004 |
| CN | 1723431 | 1/2006 |

(Continued)

OTHER PUBLICATIONS

Bell, David et al., "Sensory Semantic User Interfaces (SenSUI)" Fluidity Research Group, Oct. 20, 2009.

(Continued)

*Primary Examiner* — Jeanette J Parker

(57) ABSTRACT

Techniques to customize a user interface for different displays are described. An apparatus such as an electronic device with a processing system may implement a custom user interface system that when executed by a processor is operative to adapt a user interface view of an application for presentation by one or more displays. The custom user interface system may comprise, among other elements, a user interface adaptation component operative to receive as input a user interface view of the application for presentation on a first display and an adaptation parameter, and modify the user interface view for presentation on a second display based on the adaptation parameter. A presentation component is operative to present the customized user interface view on the second display. Other embodiments are described and claimed.

18 Claims, 13 Drawing Sheets

(56) References Cited

U.S. PATENT DOCUMENTS

| | | | |
|---|---|---|---|
| 5,717,869 A | 2/1998 | Moran et al. | |
| 5,802,299 A | 9/1998 | Logan et al. | |
| 5,821,925 A | 10/1998 | Carey et al. | |
| 5,821,932 A | 10/1998 | Pittore | |
| 5,893,098 A | 4/1999 | Peters et al. | |
| 5,907,324 A | 5/1999 | Larson et al. | |
| 6,016,478 A | 1/2000 | Zhang et al. | |
| 6,018,346 A | 1/2000 | Moran et al. | |
| 6,049,334 A | 4/2000 | Bates et al. | |
| 6,119,147 A | 9/2000 | Toomey et al. | |
| 6,192,395 B1 | 2/2001 | Lerner et al. | |
| 6,208,339 B1 | 3/2001 | Atlas et al. | |
| 6,230,185 B1 | 5/2001 | Salas et al. | |
| 6,353,436 B1 | 3/2002 | Reichlen | |
| 6,553,417 B1 | 4/2003 | Gampper | |
| 6,564,246 B1 | 5/2003 | Varma et al. | |
| 6,633,315 B1 | 10/2003 | Sobeski | |
| 6,670,970 B1 | 12/2003 | Bonura et al. | |
| 6,735,615 B1 | 5/2004 | Iwayama et al. | |
| 6,738,075 B1 | 5/2004 | Torres et al. | |
| 7,035,865 B2 | 4/2006 | Doss et al. | |
| 7,036,076 B2 | 4/2006 | Anwar | |
| 7,051,285 B1 | 5/2006 | Harrison et al. | |
| 7,073,127 B2 | 7/2006 | Zhao et al. | |
| 7,075,513 B2 | 7/2006 | Silfverberg et al. | |
| 7,124,164 B1 | 10/2006 | Chemtob | |
| 7,171,567 B1 | 1/2007 | Bayer et al. | |
| 7,203,479 B2 | 4/2007 | Deeds | |
| 7,225,257 B2 | 5/2007 | Aoike et al. | |
| 7,228,492 B1 | 6/2007 | Graham | |
| 7,233,933 B2 | 6/2007 | Horvitz et al. | |
| 7,242,389 B1 | 7/2007 | Stern | |
| 7,246,316 B2 | 7/2007 | Furlong et al. | |
| 7,248,677 B2 | 7/2007 | Randall et al. | |
| 7,251,786 B2 | 7/2007 | Wynn et al. | |
| 7,257,769 B2 | 8/2007 | Caspi | |
| 7,269,787 B2 | 9/2007 | Amitay et al. | |
| 7,299,193 B2 | 11/2007 | Cragun et al. | |
| 7,299,405 B1 | 11/2007 | Lee et al. | |
| 7,299,418 B2 | 11/2007 | Dieberger | |
| 7,401,300 B2 | 7/2008 | Nurmi | |
| 7,426,297 B2 | 9/2008 | Zhang et al. | |
| 7,447,713 B1 | 11/2008 | Berkheimerm | |
| 7,451,183 B2 | 11/2008 | Romero et al. | |
| 7,451,186 B2 | 11/2008 | Morinigo et al. | |
| 7,454,439 B1 | 11/2008 | Gansner et al. | |
| 7,466,334 B1 | 12/2008 | Baba | |
| 7,469,222 B1 | 12/2008 | Glazer | |
| 7,478,129 B1 | 1/2009 | Chemtob et al. | |
| 7,512,906 B1 | 3/2009 | Baier | |
| 7,554,576 B2 | 6/2009 | Erol et al. | |
| 7,571,210 B2 | 8/2009 | Swanson et al. | |
| 7,590,941 B2 | 9/2009 | Wee et al. | |
| 7,599,989 B2 | 10/2009 | Stevens et al. | |
| 7,606,862 B2 | 10/2009 | Swearingen et al. | |
| 7,627,830 B1 | 12/2009 | Espinoza et al. | |
| 7,636,754 B2 | 12/2009 | Zhu et al. | |
| 7,669,141 B1* | 2/2010 | Pegg | 715/781 |
| 7,679,518 B1 | 3/2010 | Pabla et al. | |
| 7,730,411 B2 | 6/2010 | Chotai et al. | |
| 7,743,098 B2 | 6/2010 | Anglin et al. | |
| 7,764,247 B2 | 7/2010 | Blanco | |
| 7,770,116 B2 | 8/2010 | Zhang et al. | |
| 7,774,221 B2 | 8/2010 | Miller et al. | |
| 7,774,703 B2 | 8/2010 | Junuzovic et al. | |
| 7,818,678 B2 | 10/2010 | Massand | |
| 7,869,941 B2 | 1/2011 | Coughlin et al. | |
| 7,911,409 B1* | 3/2011 | Chatterjee et al. | 345/3.1 |
| 7,941,399 B2 | 5/2011 | Bailor et al. | |
| 7,962,525 B2 | 6/2011 | Kansal | |
| 7,984,387 B2 | 7/2011 | Batthish et al. | |
| 7,992,089 B2 | 8/2011 | Murray et al. | |
| 8,032,832 B2 | 10/2011 | Russ et al. | |
| 8,099,458 B2 | 1/2012 | Burtner, IV et al. | |
| 8,126,974 B2 | 2/2012 | Lyle et al. | |
| 8,150,719 B2 | 4/2012 | Perrella et al. | |
| 8,161,419 B2 | 4/2012 | Palahnuk et al. | |
| 8,204,942 B2 | 6/2012 | Roskind et al. | |
| 8,214,748 B2 | 7/2012 | Srikanth et al. | |
| 8,330,795 B2 | 12/2012 | Iyer et al. | |
| 8,352,870 B2 | 1/2013 | Bailor et al. | |
| 8,358,762 B1 | 1/2013 | Renner et al. | |
| 8,385,964 B2 | 2/2013 | Haney | |
| 8,423,883 B1 | 4/2013 | Stockman | |
| 8,437,461 B1 | 5/2013 | Gartner et al. | |
| 8,452,839 B2 | 5/2013 | Heikes et al. | |
| 8,517,888 B1 | 8/2013 | Brookins | |
| 8,560,487 B2 | 10/2013 | Jhoney et al. | |
| 8,583,148 B2 | 11/2013 | Ollila et al. | |
| 8,606,517 B1 | 12/2013 | Ehrlacher et al. | |
| 8,631,119 B2 | 1/2014 | Malkin et al. | |
| 8,667,401 B1 | 3/2014 | Lozben | |
| 8,682,973 B2 | 3/2014 | Kikin-Gil et al. | |
| 8,768,308 B2 | 7/2014 | Kim et al. | |
| 8,826,117 B1 | 9/2014 | Junee | |
| 9,118,612 B2 | 8/2015 | Fish et al. | |
| 9,383,888 B2 | 7/2016 | Fish | |
| 2001/0040592 A1 | 11/2001 | Foreman et al. | |
| 2002/0143876 A1 | 10/2002 | Boyer et al. | |
| 2002/0143877 A1 | 10/2002 | Hackbarth et al. | |
| 2003/0020805 A1 | 1/2003 | Allen et al. | |
| 2003/0038831 A1 | 2/2003 | Engelfriet | |
| 2003/0046296 A1 | 3/2003 | Doss | |
| 2003/0122863 A1 | 7/2003 | Dieberger et al. | |
| 2003/0137539 A1 | 7/2003 | Dees | |
| 2003/0142133 A1 | 7/2003 | Brown et al. | |
| 2003/0158900 A1 | 8/2003 | Santos | |
| 2003/0179230 A1 | 9/2003 | Seidman | |
| 2003/0220973 A1 | 11/2003 | Zhu et al. | |
| 2003/0222890 A1 | 12/2003 | Salesin et al. | |
| 2004/0024822 A1 | 2/2004 | Werndorfer et al. | |
| 2004/0027370 A1 | 2/2004 | Jaeger | |
| 2004/0030992 A1 | 2/2004 | Moisa et al. | |
| 2004/0062383 A1 | 4/2004 | Sylvain | |
| 2004/0085354 A1 | 5/2004 | Massand | |
| 2004/0128350 A1 | 7/2004 | Topfl et al. | |
| 2004/0150627 A1 | 8/2004 | Luman et al. | |
| 2004/0161090 A1 | 8/2004 | Digate et al. | |
| 2004/0169683 A1 | 9/2004 | Chiu et al. | |
| 2004/0175036 A1 | 9/2004 | Graham | |
| 2004/0194033 A1 | 9/2004 | Holzwarth et al. | |
| 2004/0196286 A1 | 10/2004 | Guzik | |
| 2004/0230594 A1 | 11/2004 | Flam et al. | |
| 2004/0250201 A1 | 12/2004 | Caspi | |
| 2004/0254998 A1 | 12/2004 | Horvitz | |
| 2004/0263636 A1 | 12/2004 | Cutler et al. | |
| 2004/0267701 A1 | 12/2004 | Horvitz et al. | |
| 2005/0005025 A1 | 1/2005 | Harville et al. | |
| 2005/0018828 A1 | 1/2005 | Nierhaus et al. | |
| 2005/0055625 A1 | 3/2005 | Kloss | |
| 2005/0081160 A1 | 4/2005 | Wee et al. | |
| 2005/0088410 A1 | 4/2005 | Chaudhri | |
| 2005/0091571 A1 | 4/2005 | Leichtling | |
| 2005/0091596 A1 | 4/2005 | Anthony et al. | |
| 2005/0125246 A1 | 6/2005 | Muller et al. | |
| 2005/0125717 A1 | 6/2005 | Segal et al. | |
| 2005/0138109 A1 | 6/2005 | Redlich et al. | |
| 2005/0138570 A1 | 6/2005 | Good et al. | |
| 2005/0171830 A1 | 8/2005 | Miller et al. | |
| 2005/0246642 A1 | 11/2005 | Valderas | |
| 2005/0285845 A1* | 12/2005 | Dehlin | 345/173 |
| 2006/0004911 A1 | 1/2006 | Becker et al. | |
| 2006/0010023 A1 | 1/2006 | Tromczynski et al. | |
| 2006/0010197 A1 | 1/2006 | Ovenden | |
| 2006/0026253 A1 | 2/2006 | Kessen et al. | |
| 2006/0053380 A1 | 3/2006 | Spataro et al. | |
| 2006/0067250 A1 | 3/2006 | Boyer et al. | |
| 2006/0080610 A1 | 4/2006 | Kaminsky | |
| 2006/0082594 A1 | 4/2006 | Vafiadis et al. | |
| 2006/0094441 A1 | 5/2006 | Beckmann et al. | |
| 2006/0132507 A1 | 6/2006 | Wang | |
| 2006/0136828 A1 | 6/2006 | Asano | |
| 2006/0143063 A1 | 6/2006 | Braun et al. | |
| 2006/0143064 A1 | 6/2006 | Mock et al. | |

(56) References Cited

U.S. PATENT DOCUMENTS

| | | |
|---|---|---|
| 2006/0146765 A1 | 7/2006 | Van De Sluis et al. |
| 2006/0161585 A1 | 7/2006 | Clarke et al. |
| 2006/0167996 A1 | 7/2006 | Orsolini et al. |
| 2006/0168533 A1 | 7/2006 | Yip et al. |
| 2006/0171515 A1 | 8/2006 | Hintermeister et al. |
| 2006/0184872 A1 | 8/2006 | Dontcheva et al. |
| 2006/0190547 A1 | 8/2006 | Bhogal et al. |
| 2006/0195587 A1 | 8/2006 | Cadiz et al. |
| 2006/0213443 A1 | 9/2006 | Yeom |
| 2006/0234735 A1 | 10/2006 | Digate et al. |
| 2006/0239212 A1 | 10/2006 | Pirzada et al. |
| 2006/0244734 A1* | 11/2006 | Hill ................. G06F 3/0488 345/173 |
| 2006/0259875 A1 | 11/2006 | Collins et al. |
| 2006/0265398 A1 | 11/2006 | Kaufman |
| 2006/0282759 A1 | 12/2006 | Collins et al. |
| 2007/0005752 A1 | 1/2007 | Chawla et al. |
| 2007/0011231 A1 | 1/2007 | Manion |
| 2007/0033091 A1 | 2/2007 | Ravikumar et al. |
| 2007/0083597 A1 | 4/2007 | Salesky et al. |
| 2007/0100937 A1 | 5/2007 | Burtner, IV et al. |
| 2007/0106724 A1 | 5/2007 | Gorti et al. |
| 2007/0109939 A1 | 5/2007 | Shimizu et al. |
| 2007/0112926 A1 | 5/2007 | Brett et al. |
| 2007/0150583 A1 | 6/2007 | Asthana et al. |
| 2007/0168447 A1 | 7/2007 | Chen et al. |
| 2007/0174389 A1 | 7/2007 | Armstrong et al. |
| 2007/0185870 A1 | 8/2007 | Hogue et al. |
| 2007/0186171 A1 | 8/2007 | Junuzovic et al. |
| 2007/0189487 A1 | 8/2007 | Sharland et al. |
| 2007/0214423 A1 | 9/2007 | Teplov et al. |
| 2007/0219645 A1 | 9/2007 | Thomas et al. |
| 2007/0226032 A1 | 9/2007 | White et al. |
| 2007/0226299 A1 | 9/2007 | Shaffer et al. |
| 2007/0245238 A1 | 10/2007 | Fuggitt et al. |
| 2007/0253424 A1 | 11/2007 | Herot et al. |
| 2007/0276909 A1 | 11/2007 | Chavda et al. |
| 2007/0279416 A1 | 12/2007 | Cobb et al. |
| 2007/0294612 A1 | 12/2007 | Drucker et al. |
| 2007/0300185 A1 | 12/2007 | Macbeth |
| 2008/0001717 A1 | 1/2008 | Fiatal |
| 2008/0005235 A1 | 1/2008 | Hegde et al. |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0040187 A1 | 2/2008 | Carraher et al. |
| 2008/0040188 A1 | 2/2008 | Klausmeier |
| 2008/0059889 A1 | 3/2008 | Parker et al. |
| 2008/0065580 A1 | 3/2008 | Spence et al. |
| 2008/0066016 A1 | 3/2008 | Dowdy et al. |
| 2008/0084984 A1 | 4/2008 | Levy et al. |
| 2008/0098328 A1 | 4/2008 | Rollin et al. |
| 2008/0109406 A1 | 5/2008 | Krishnasamy et al. |
| 2008/0114844 A1 | 5/2008 | Sanchez et al. |
| 2008/0115076 A1 | 5/2008 | Frank et al. |
| 2008/0133551 A1 | 6/2008 | Wensley et al. |
| 2008/0136897 A1 | 6/2008 | Morishima et al. |
| 2008/0141126 A1 | 6/2008 | Johnson et al. |
| 2008/0147790 A1 | 6/2008 | Malaney et al. |
| 2008/0177782 A1 | 7/2008 | Poston et al. |
| 2008/0189624 A1 | 8/2008 | Chotai et al. |
| 2008/0239995 A1 | 10/2008 | Lee et al. |
| 2008/0244442 A1 | 10/2008 | Veselova et al. |
| 2008/0263010 A1 | 10/2008 | Roychoudhuri et al. |
| 2008/0263460 A1 | 10/2008 | Altberg |
| 2008/0276174 A1 | 11/2008 | Hintermeister et al. |
| 2008/0288889 A1 | 11/2008 | Hunt et al. |
| 2008/0300944 A1 | 12/2008 | Surazski et al. |
| 2008/0303746 A1 | 12/2008 | Schlottmann et al. |
| 2008/0307322 A1 | 12/2008 | Stochosky et al. |
| 2008/0320082 A1 | 12/2008 | Kuhlke et al. |
| 2009/0006980 A1 | 1/2009 | Hawley et al. |
| 2009/0006982 A1 | 1/2009 | Curtis et al. |
| 2009/0007014 A1 | 1/2009 | Corner et al. |
| 2009/0019367 A1 | 1/2009 | Cavagnari et al. |
| 2009/0030766 A1 | 1/2009 | Denner et al. |
| 2009/0037848 A1 | 2/2009 | Tewari et al. |
| 2009/0043856 A1 | 2/2009 | Darby |
| 2009/0055739 A1 | 2/2009 | Murillo |
| 2009/0089055 A1 | 4/2009 | Caspi et al. |
| 2009/0094367 A1 | 4/2009 | Song et al. |
| 2009/0109180 A1 | 4/2009 | Do et al. |
| 2009/0112703 A1 | 4/2009 | Brown |
| 2009/0119255 A1 | 5/2009 | Frank et al. |
| 2009/0119604 A1 | 5/2009 | Simard et al. |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0183095 A1 | 7/2009 | Deitsch |
| 2009/0204465 A1 | 8/2009 | Pradhan |
| 2009/0204671 A1 | 8/2009 | Hawkins et al. |
| 2009/0210793 A1 | 8/2009 | Yee et al. |
| 2009/0210822 A1 | 8/2009 | Schindler |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235177 A1* | 9/2009 | Saul et al. ................. 715/740 |
| 2009/0249223 A1 | 10/2009 | Barsook et al. |
| 2009/0254843 A1 | 10/2009 | Van Wie et al. |
| 2009/0265632 A1 | 10/2009 | Russ et al. |
| 2009/0282339 A1 | 11/2009 | Van Melle et al. |
| 2009/0309846 A1 | 12/2009 | Trachtenberg et al. |
| 2009/0313125 A1* | 12/2009 | Roh ................. G06Q 30/0224 705/14.66 |
| 2009/0313584 A1* | 12/2009 | Kerr et al. ................. 715/849 |
| 2009/0319562 A1 | 12/2009 | Holm-Petersen et al. |
| 2009/0327019 A1 | 12/2009 | Addae et al. |
| 2009/0327425 A1 | 12/2009 | Gudipaty |
| 2010/0031152 A1 | 2/2010 | Villaron et al. |
| 2010/0037140 A1 | 2/2010 | Penner et al. |
| 2010/0037151 A1 | 2/2010 | Ackerman et al. |
| 2010/0058201 A1 | 3/2010 | Harvey et al. |
| 2010/0079467 A1 | 4/2010 | Boss et al. |
| 2010/0095198 A1 | 4/2010 | Bultrowicz et al. |
| 2010/0097331 A1 | 4/2010 | Wu |
| 2010/0114691 A1 | 5/2010 | Wu et al. |
| 2010/0114991 A1 | 5/2010 | Chaudhary et al. |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0174993 A1 | 7/2010 | Pennington et al. |
| 2010/0201707 A1 | 8/2010 | Rasmussen et al. |
| 2010/0235216 A1 | 9/2010 | Hehmeyer et al. |
| 2010/0235763 A1 | 9/2010 | Massand |
| 2010/0241968 A1 | 9/2010 | Tarara et al. |
| 2010/0251140 A1 | 9/2010 | Tipirneni |
| 2010/0268705 A1 | 10/2010 | Douglas et al. |
| 2010/0279266 A1 | 11/2010 | Laine et al. |
| 2010/0295958 A1* | 11/2010 | Larsson et al. ............ 348/222.1 |
| 2010/0306004 A1 | 12/2010 | Burtner et al. |
| 2010/0306018 A1 | 12/2010 | Burtner et al. |
| 2010/0312706 A1 | 12/2010 | Combet et al. |
| 2010/0324963 A1 | 12/2010 | Gupta et al. |
| 2011/0022967 A1 | 1/2011 | Vijayakumar |
| 2011/0105092 A1 | 5/2011 | Felt et al. |
| 2011/0107241 A1 | 5/2011 | Moore |
| 2011/0113348 A1 | 5/2011 | Twiss et al. |
| 2011/0113351 A1 | 5/2011 | Phillips |
| 2011/0137894 A1* | 6/2011 | Narayanan et al. .......... 707/723 |
| 2011/0153612 A1* | 6/2011 | Paul ................. G06F 17/30905 707/740 |
| 2011/0154180 A1 | 6/2011 | Evanitsky et al. |
| 2011/0154192 A1 | 6/2011 | Yang et al. |
| 2011/0161130 A1 | 6/2011 | Whalin |
| 2011/0185288 A1 | 7/2011 | Gupta et al. |
| 2011/0212430 A1 | 9/2011 | Smithmier et al. |
| 2011/0239142 A1* | 9/2011 | Steeves et al. ............... 715/764 |
| 2011/0282871 A1 | 11/2011 | Seefeld et al. |
| 2011/0289142 A1 | 11/2011 | Whalin |
| 2011/0289433 A1 | 11/2011 | Whalin |
| 2011/0295879 A1 | 12/2011 | Logis et al. |
| 2012/0023418 A1 | 1/2012 | Frields et al. |
| 2012/0050197 A1 | 3/2012 | Kemmochi |
| 2012/0075337 A1 | 3/2012 | Rasmussen et al. |

(56) References Cited

U.S. PATENT DOCUMENTS

| | | |
|---|---|---|
| 2012/0078708 A1 | 3/2012 | Taylor et al. |
| 2012/0144325 A1 | 6/2012 | Mital et al. |
| 2012/0150577 A1 | 6/2012 | Berg |
| 2012/0150863 A1 | 6/2012 | Fish |
| 2012/0159347 A1 | 6/2012 | Fish et al. |
| 2012/0159355 A1 | 6/2012 | Fish et al. |
| 2012/0179980 A1 | 7/2012 | Whalin |
| 2012/0179981 A1 | 7/2012 | Whalin |
| 2012/0233543 A1 | 9/2012 | Vagell et al. |
| 2013/0007103 A1 | 1/2013 | Braun et al. |
| 2013/0035853 A1 | 2/2013 | Stout et al. |
| 2013/0091205 A1 | 4/2013 | Kotler et al. |
| 2013/0091440 A1 | 4/2013 | Kotler et al. |
| 2013/0091465 A1 | 4/2013 | Kikin-Gil et al. |
| 2013/0097544 A1 | 4/2013 | Parker et al. |
| 2013/0101978 A1 | 4/2013 | Ahl et al. |
| 2013/0124978 A1 | 5/2013 | Horns et al. |
| 2013/0125051 A1 | 5/2013 | Kelley et al. |
| 2013/0132886 A1 | 5/2013 | Mangini |
| 2013/0154946 A1 | 6/2013 | Sakuramata et al. |
| 2013/0211980 A1 | 8/2013 | Heiferman |
| 2013/0212494 A1 | 8/2013 | Heiferman |
| 2013/0239002 A1 | 9/2013 | Maloney et al. |
| 2013/0246903 A1 | 9/2013 | Mukai |
| 2013/0263020 A1 | 10/2013 | Heiferman |
| 2014/0032481 A1 | 1/2014 | Lang |
| 2014/0033068 A1 | 1/2014 | Gupta et al. |
| 2014/0033088 A1 | 1/2014 | Shaver |
| 2014/0207867 A1 | 7/2014 | Kotler et al. |
| 2014/0317561 A1 | 10/2014 | Robinson et al. |
| 2015/0127628 A1 | 5/2015 | Rathod |

FOREIGN PATENT DOCUMENTS

| | | |
|---|---|---|
| CN | 1886977 | 12/2006 |
| CN | 1928859 | 3/2007 |
| CN | 1992625 | 7/2007 |
| CN | 101198976 | 6/2008 |
| CN | 101363739 | 2/2009 |
| CN | 101364886 | 2/2009 |
| CN | 101515226 | 8/2009 |
| CN | 101689188 | 3/2010 |
| CN | 101789871 | 7/2010 |
| CN | 101834905 | 9/2010 |
| EP | 1517260 | 3/2005 |
| JP | 04257046 | 9/1992 |
| JP | 2010176320 | 8/2010 |
| RU | 2005139793 | 6/2007 |
| WO | WO 02061682 | 8/2002 |
| WO | 2006/100475 | 6/2006 |
| WO | WO-2007092470 | 8/2007 |

OTHER PUBLICATIONS

Zenghong, Wu et al. "Context Awareness and Modeling in Self-Adaptive Geo-Information Visualization" Retrieved on Aug. 30, 2010.

Mitrovic, Nikola et al. "Adaptive User Interface for Mobile Devices" Published 2002.

"Final Office Action", U.S. Appl. No. 12/473,206, filed (Dec. 7, 2011), 36 pages.

"Non-Final Office Action", U.S. Appl. No. 12/486,762, filed (Oct. 14, 2011), 24 pages.

"Online Calendar & Group Scheduling", *MOSAIC Technologies*, retrieved from <http://www.webexone.com/Brandded/ID.asp?brandid=2348&pg=%20AppCalendar> on Apr. 24, 2009, 4 pages.

Ju, Wendy et al., "Where the Wild Things Work: Capturing Shared Physical Design Workspaces", *Stanford University, CSCW '04*, (Nov. 6, 2010), pp. 533-541.

"Adobe Connect", *Retrieved from*: <http://www.adobe.com/acom/connectnow/> on Oct. 11, 2010, (Sep. 16, 2010),3 pages.

"Adobe ConnectNow", *Retrieved from*: <http://www.adobe.com/acom/connectnow/> on Oct. 13, 2010, (2010),6 pages.

"Cisco Context-Aware Mobility Solution: Presence Applications", retrieved from https://www.cisco.com/en/US/solutions/collateral/ns340/ns394/ns348/ns788/brochure_c22-497557.html on Sep. 7, 2010, 5 pages.

"Description for SharePoint Meeting Manager", *Retrieved from*: <http://www.softpicks.net/software/Business/Project-Management/SharePoint-Meeting-Manager-47146.htm> on Oct. 11, 2010, (Jul. 27, 2009),2 pages.

"GoToMeeting", *Retrieved from*: <http://www.gotomeeting.com/fec/online_meeting> on Oct. 11, 2010, 1 page.

"Meet mimio—The Digital Meeting Assistant", *Mayflower Business Systems Limited*; http://www.kda.co.uk/mimio1/whitepaper.html, (May 1999),10 pages.

"Meeting Center, Using Video in Your Meetings", retrieved from http://www.oucs.ox.ac.uk/webex/Windows/Video.pdf on May 13, 2009; *Cisco webex*, 2 pages.

"Meeting Management Software", *Retrieved from*: <http://workingsmarter.typepad.com/my_weblog/2004/12/meeting_managem.html> on Oct. 11, 2010, (Dec. 10, 2004),2 pages.

"Microsoft Office Communicator 2007 Getting Started Guide", retrieved from http://www.ittdublin.ie/media/Media,22233,en.pdf, (Jul. 2007),77 pages.

"Microsoft® Office Live Meeting Feature Guide", *Microsoft Corporation*, Available at <http://download.microsoft.com/download/8/0/3/803f9ba6-5e12-4b40-84d9-d8a91073e3dc/LiveMeeting.doc>,(Jan. 2005),pp. 1-17.

"Non-Final Office Action", U.S. Appl. No. 12/473,206, filed (May 19, 2011),28 pages.

Adams, Lia et al., "Distributed Research Teams: Meeting Asynchronously in Virtual Space", *Institute of Electrical and Electronics Engineers*, (1999),17 pages.

Bunzel, Tom "Using Quindi Meeting Capture", retrieved from http://www.informit.com/guides/content.aspx?g=msoffice&seqNum=220, (Sep. 1, 2006),3 pages.

Fruchter, Renate "Brick & Bits & Interaction (BBI)", http://www.ii.ist.i.kyoto-u.ac.jp/sid/sid2001/papers/positions/bricksbitsinteraction.pdf, (2001),4 pages.

Ionescu, Arna et al., "Workspace Navigator: Tools for Capture, Recall and Reuse using Spatial Cues in an Interactive Workspace", *Stanford Technical Report TR2002-04*, http://bcj.stanford.edu/research/wkspcNavTR.pdf, (2002),16 pages.

Karlson, Amy et al., "Courier: A Collaborative Phone-Based File Exchange System", *Technical Report; MSR-TR-2008-05; Microsoft Research*, (Jan. 2008),17 pages.

Kim, Hyun H., et al., "SmartMeeting: CMPT 481/811 Automatic Meeting Recording System", http://www.cs.usask.ca/grads/hyk564/homePage/811/CMPT%20811%20final.doc, (2004),7 pages.

Peddemors, A.J.H. et al., "Presence, Location and Instant Messaging in a Context-Aware Application Framework", retrieved from htt://citeseerx.ist.psu.edu/viewdoc/download?doi=10.11.1.98.3321&rep=rep1&type=pdf; 4th International Conference on Mobile Data Management, MDM, (2003),6 pages.

Rudnicky, Alexander I., et al., "Intelligently Integrating Information from Speech and Vision to Perform Light-weight Meeting Understanding", retrieved from http://citeseerx.ist.psu.edu/viewdoc/download?doi=10.1.1.126.1733&rep=rep1&type=pdf, (Oct. 2005),6 pages.

Watson, Richard "What is Mobile Presence?", *Retrieved from* http://reseller.tmcnet.com/topics/unified-communications/articles/54033-what-mobile-presence.htm, (Apr. 10, 2009),4 pages.

Werle, Patrik et al., "Active Documents Supporting Teamwork in a Ubiquitous Computing Environment", *The Research Group on Ubiquitous Computing; Department of Computer and Systems Sciences; KTH Center for Wireless Systems; retrieved from* http://citeseerx.ist.psu.edu/viewdoc/summary?doi=10.1.1.157.4661, (2001),4 pages.

Yu, Shoou-Jong et al., "Who Said What When? Capturing Important Moments of a Meeting", *retrieved from* http://repository.cmu.edu/cgi/viewcontent.cgi?article=1003&context=silicon_valley; *Technical Report*, (Apr. 10-15, 2010),7 pages.

(56) References Cited

OTHER PUBLICATIONS

"Final Office Action", U.S. Appl. No. 12/486,762, filed (Feb. 8, 2012),28 pages.
"Final Office Action", U.S. Appl. No. 12/965,965, filed (Nov. 8, 2012), 12 pages.
"Non-Final Office Action", U.S. Appl. No. 12/965,965, filed (Jun. 4, 2012), 12 pages.
"Non-Final Office Action", U.S. Appl. No. 12/968,332, filed (Jul. 23, 2012), 19 pages.
"Foreign Office Action", CN Application No. 201110436306.8, Nov. 15, 2014, 6 pages.
"Foreign Office Action", CN Application No. 201110436635.2, Nov. 27, 2014, 11 pages.
"Foreign Office Action", CN Application No. 201110443291.8, Nov. 21, 2014, 8 Pages.
"Non-Final Office Action", U.S. Appl. No. 12/968,332, filed Oct. 9, 2014, 23 pages.
"Final Office Action", U.S. Appl. No. 12/473,206, filed Oct. 8, 2015, 39 pages.
"Foreign Office Action", CN Application No. 201110436635.2, Oct. 20, 2015, 12 Pages.
"Notice on Reexamination", CN Application No. 201110443291.8, Aug. 24, 2015, 9 pages.
"CSS Max-width Property", Retrieved From: http://web.archive.org/web/20070608101036/http://www.w3schools.com/, 2007, 1 page.
"Create Treemaps Using Easy Drag-and-drop Interactions", Retrieved From: http://www.magnaview.nl/treemap/, 2010, 1 page.
"GeoTime", Retrieved at: https://web.archive.org/web/20101219085705/http://www.geotime.com/Product/GeoTime-%281%29/Features—Benefits.aspx, 2009, 10 pages.
"The Beginner's Guide to Data Visualization", Retrieved From: http://www.tableausoftware.com/beginners-data-visualization, 2010, 10 Pages.
"Foreign Office Action", CN Application No. 201110436593.2, Jan. 6, 2014, 11 Pages.
"Collaboration within the Telepresence Experience", Retrieved From: http://www.wrplatinum.com/downloads/11056.aspx, Jan. 2010, 11 Pages.
"Foreign Office Action", CN Application No. 200980131157.5, Nov. 21, 2013, 11 pages.
"Non-Final Office Action", U.S. Appl. No. 12/965,965, filed Jun. 4, 2012, 12 pages.
"Non-Final Office Action", U.S. Appl. No. 13/253,886, filed Apr. 11, 2013, 13 pages.
"Final Office Action", U.S. Appl. No. 11/260,515, filed Feb. 24, 2011, 14 pages.
"Non-Final Office Action", U.S. Appl. No. 13/272,832, filed Aug. 12, 2013, 15 pages.
"Non-Final Office Action", U.S. Appl. No. 12/472,101, filed Oct. 5, 2011, 15 pages.
"Non-Final Office Action", U.S. Appl. No. 12/184,174, filed Feb. 4, 2011, 16 pages.
"Non-Final Office Action", U.S. Appl. No. 11/260,515, filed Mar. 3, 2009, 16 pages.
"Final Office Action", U.S. Appl. No. 12/472,101, filed Mar. 28, 2012, 16 pages.
"Non-Final Office Action", U.S. Appl. No. 12/184,174, filed Sep. 25, 2013, 16 pages.
"Non-Final Office Action", U.S. Appl. No. 12/965,965, filed Dec. 20, 2013, 16 pages.
"Non-Final Office Action", U.S. Appl. No. 11/260,515, filed Sep. 30, 2010, 17 pages.
"Final Office Action", U.S. Appl. No. 13/272,832, filed Dec. 30, 2013, 18 Pages.
"Non-Final Office Action", U.S. Appl. No. 12/184,174, filed Mar. 13, 2012, 19 pages.
"Final Office Action", U.S. Appl. No. 11/260,515, filed Dec. 11, 2009, 19 pages.

"Meeting Center Using Video in Your Meetings", Retrieved From: http://www.oucs.ox.ac.uk/webex/Windows/Video.pdf, May 13, 2009, 2 Pages.
"Mindshift Innovation", Retrieved From: http://mindshiftinnovation.blogspot.com/2007/09/seadragon.html, Oct. 4, 2007, 2 Pages.
"Datapoint version 1.1", Retrieved From: http://www.filedudes.com/DataPoint-download-20853.html, 1997-2007, 2 Pages.
"FREE PhotoMesa 3.1.2 (Windows)", Retrieved From: https://web.archive.org/web/20071209231951/http://www.windsorinterfaces.com/photomesa.shtml, 2007, 2 Pages.
"ZuiPrezi Nonlinear Presentation Editor", ZuiPrezi Ltd., http://zuiprezi.kibu.hu/, 2007, 2 pages.
"ProShow Producer Feature Overview", Photodex Corporation: http://www.photodex.com/products/producer/features.html, 2008, 2 pages.
"Final Office Action", U.S. Appl. No. 12/184,174, filed Sep. 6, 2011, 20 pages.
"Final Office Action", U.S. Appl. No. 12/184,174, filed Nov. 20, 2012, 20 pages.
"Final Office Action", U.S. Appl. No. 12/967,497, filed Dec. 3, 2013, 20 pages.
"Non-Final Office Action", U.S. Appl. No. 12/968,332, filed Dec. 5, 2013, 20 pages.
"An Overview of Aabel 3Features", Retrieved From: http://www.gigawiz.com/aabel3.html, Aug. 9, 2011, 21 pages.
"CounterPoint User Manual", Retrieved From: http://www.cs.umd.edu/hcil/counterpoint/, 2005, 21 pages.
"Human and Technical Factors of Distributed Group Drawing Tools", Retrieved From: http://grouplab.cpsc.ucalgary.ca/grouplab/uploads/Publications/Publications/1992-HumanTech.IWC.pdf, 1992, 29 Pages.
"CounterPoint: A Zooming Presentation Tool", Retrieved From: http://web.archive.org/web/20050205082738/www.cs.umd.edu/hcil/counterpoint/, Feb. 5, 2005, 3 Pages.
"FREEPATH-EDU Nonlinear Presentation Software", Grass Roots Software, 2008, 3 pages.
"Aquatic Sugar: The Children's Interface, Translated for Adults", Retrieved From: http://www.olpcnews.com/software/operating_system/aquatic_sugar_childrens_interface.html, Nov. 7, 2007, 5 Pages.
"Extended European Search Report", EP Application No. 09803312.9, Jul. 7, 2011, 6 pages.
"Foreign Office Action", CN Application No. 200980131157.5, Jan. 30, 2013, 7 pages.
"Foreign Office Action", CN Application No. 200980131157.5, Aug. 31, 2012, 7 pages.
"Visualize and Map SalesForce Leads with SpatiaiKey", Retrieved From: http://web.archive.org/web/20101120170237/http://www.spatialkey.com/support/tutorials/visualize-and-map-salesforce-leads-with-spatialkey-part-ii, 2010, 7 Pages.
"Foreign Office Action", CN Application No. 200980131157.5, Jul. 23, 2013, 8 pages.
et al.,' "International Search Report and Written Opinion", Application No. PCT/US2009/046529, Nov. 30, 2009, 11 Pages.
Derthick, et al.,' "An Interactive Visualization Environment for Data Exploration", Retrieved From: http://www.cs.cmu.edu/~sage/KDD97.html, Aug. 1997, 10 Pages.
Fernando, et al.,' "Narrowcasting Attributes for Presence Awareness in Collaborative Virtual Environments pdf", http://ieeexplore.ieee.org/stamp/stamp.jsp?tp=&arnumber=4019930, 2006, 6 pages.
Geyer, et al.,' "Activity Explorer: Activity-centric Collaboration from Research to Product", IBM Systems Journal, IBM® Retrieved From: http://www.research.ibm.com/journal/sj/454/geyer.html., 2006, 26 Pages.
Good, et al.,' "CounterPoint: Creating Jazzy Interactive Presentations", Retrieved From: http://drum.lib.umd.edu/bitstream/1903/1121/2/CS-TR-4225.pdf, 2001-2003, 9 Pages.
Hewagamage, "Interactive Visualization of Spatiotemporal Patterns Using Spirals on a Geographical Map", Proc. IEEE Symp. Visual Languages, 1999, 8 pages.
Hupfer, "Introducing Collaboration into an Application Development Environment", Retrieved From: http://pnexpert.com/files/IBM_Contextual_Collaboration.pdf, Nov. 6-10, 2004, 4 Pages.

(56) References Cited

OTHER PUBLICATIONS

Izadi, et al.,' "Dynamo: A public interactive surface supporting the cooperative sharing and exchange of media", Retrieved From: http://research.microsoft.com/pubs/132613/p159-izadi.pdf, 2003, 10 Pages.

Little, "High-End Business Intelligence with Data Visualization for WPF 4", Retrieved From: http://www.codeproject.com/Articles/90591/High-End-Business-Intelligence-with-Data-Visualization, Jun. 29, 2010, 7 Pages.

Moran, et al.,' "Tailorable Domain Objects as Meeting Tools for an Electronic Whiteboard", Retrieved From: http://pdf.aminer.org/000/121/871/tailorable_domain_objects_as_meeting_tools_for_an_electronic_whiteboard.pdf, 1998, 10 Pages.

Nelson, "Just Around the Corner: Visual Fusion 4.5", Retrieved From: http://www.idvsolutions.com/Company/Newsletters/2009/Q3/Vfx45Silverlight.aspx, Sep. 30, 2009, 6 Pages.

Shaw, "Create Pan andd Zoom Effects in PowerPoint", Retrieved From: http://office.microsoft.com/en-us/powerpoint-help/create-pan-and-zoom-effects-in-powerpoint-HA010232631.aspx, 2007, 13 Pages.

Thomas, et al.,' "Through-Walls Collaboration", Retrieved From: http://www.tinmith.net/papers/piekarski-pervasive-2009.pdf, 2009, 8 Pages.

Wempen, "PowerPoint 2007 Bible", John Wiley & Sons, Feb. 27, 2007, 27 pages.

Weverka, "PowerPoint 2007 All-in-One Desk Reference for Dummies", Published by Wiley Publishing, Jan. 2007, 8 pages.

"Foreign Office Action", CN Application No. 201110436306.8, Feb. 8, 2014, 13 Pages.

"Non-Final Office Action", U.S. Appl. No. 12/968,287, filed Mar. 27, 2014, 18 pages.

"Non-Final Office Action", U.S. Appl. No. 12/486,762, filed (Feb. 14, 2013), 29 pages.

"Final Office Action", U.S. Appl. No. 12/965,965, filed Mar. 11, 2015, 17 pages.

"Final Office Action", U.S. Appl. No. 12/968,287, filed Jun. 5, 2015, 21 pages.

"Foreign Notice of Allowance", CN Application No. 201110436306.8, Apr. 1, 2015, 4 Pages.

"Foreign Office Action", CN Application No. 201110436593.2, Mar. 16, 2015, 7 Pages.

"Foreign Office Action", CN Application No. 201110436635.2, May 18, 2015, 14 Pages.

"Non-Final Office Action", U.S. Appl. No. 12/473,206, filed Apr. 9, 2015, 55 pages.

"Non-Final Office Action", U.S. Appl. No. 12/967,497, filed Mar. 13, 2015, 21 pages.

"Non-Final Office Action", U.S. Appl. No. 12/968,287, filed Mar. 27, 2015, 18 pages.

"Notice of Allowance", U.S. Appl. No. 12/968,332, filed Apr. 10, 2015, 15 pages.

Pash,"Google Docs Updates with a Drawing Editor, Real-Time Collaboration, and Speed", Retrieved from <http://lifehacker.com/5513760/google-docs-updates-with-a-drawing-editor-real-time-collaboration-and-speed> on Jun. 8, 2015, Jun. 5, 2015, 17 pages.

"Final Office Action", U.S. Appl. No. 13/253,886, filed Feb. 14, 2014, 26 Pages.

"Final Office Action", U.S. Appl. No. 12/965,965, filed Jun. 5, 2014, 13 pages.

"Final Office Action", U.S. Appl. No. 12/968,287, filed Jun. 6, 2014, 19 pages.

"Final Office Action", U.S. Appl. No. 12/968,332, filed Jul. 17, 2014, 23 pages.

"Foreign Notice of Allowance", RU Application No. 2011103151, Sep. 4, 2013, 18 pages.

"Final Office Action", U.S. Appl. No. 12/967,497, filed Jul. 2, 2015, 24 pages.

"Foreign Notice of Allowance", CN Application No. 201110436593.2, Jun. 4, 2015, 6 Pages.

"Final Office Action", U.S. Appl. No. 12/486,762, filed (Jun. 20, 2013), 42 pages.

"Final Office Action", U.S. Appl. No. 12/968,332, filed (Aug. 1, 2013),19 pages.

"Non-Final Office Action", U.S. Appl. No. 12/967,497, filed (Jun. 20, 2013),19 pages.

Bergmann, et al., "Automated Assistance for the Telemeeting Lifecycle", *Proceedings of the ACM conference on Computer supported cooperative work*, (Oct. 1994), pp. 373-384.

"Final Office Action", U.S. Appl. No. 12/184,174, filed Aug. 11, 2014, 18 pages.

"Foreign Office Action", CN Application No. 201110436306.8, Sep. 17, 2014, 7 Pages.

"Foreign Office Action", CN Application No. 201110436593.2, Sep. 12, 2014, 12 Pages.

"Foreign Office Action", CN Application No. 201110436635.2, May 27, 2014, 14 pages.

"Foreign Office Action", CN Application No. 201110443291.8, Jan. 24, 2014, 12 Pages.

"Foreign Office Action", CN Application No. 201110443291.8, Jul. 24, 2014, 10 Pages.

"Non-Final Office Action", U.S. Appl. No. 12/472,101, filed Sep. 16, 2014, 10 pages.

"Non-Final Office Action", U.S. Appl. No. 12/473,206, filed Jul. 31, 2014, 41 pages.

"Non-Final Office Action", U.S. Appl. No. 12/965,965, filed Oct. 2, 2014, 14 pages.

"Non-Final Office Action", U.S. Appl. No. 13/253,886, filed Aug. 14, 2014, 15 pages.

"Non-Final Office Action", U.S. Appl. No. 14/225,234, filed Jul. 18, 2014, 5 pages.

"Notice on Reexamination", CN Application No. 201110443291.8, Jan. 4, 2016, 10 Pages.

"Non-Final Office Action", U.S. Appl. No. 12/968,287, filed Nov. 20, 2015, 22 pages.

"Office Action Issued in Chinese Patent Application No. 201210376181.9", dated Aug. 17, 2016, 12 Pages.

"Office Action Issued in Chinese Patent Application No. 201210376206.5", dated Mar. 9, 2016, 9 Pages.

Chinese Decision on Reexamination dated Dec. 5, 2016, in Application 201210376181.9, 17 pages. (No English Translation).

Chinese Fifth Office Action dated May 30, 2014 in Appln No. 200980131157.5, 9 pgs.

Chinese Final Rejection Received for Chinese Patent Application No. 201210376181.9, dated Jan. 20, 2016, 14 Pages.

Chinese Notice of Allowance dated Nov. 30, 2016, in Appln No. 201210382816.6, 4 pgs.

Chinese Notice of Reexamination dated Dec. 7, 2016, in Appln. No. 201210376206.5, 10 pages.

Chinese Office Action dated Apr. 3, 2015 in Appln No. 201210376206.5, 15 pgs.

Chinese Office Action dated Feb. 3, 2015 in Appln No. 201210382816.6, 13 pgs.

Chinese Office Action dated Nov. 2, 2014 in Appln No. 201210376181.9, 16 pgs.

Chinese Second Office Action dated Aug. 26, 2015 in Appln No. 201210382816.6, 14 pgs.

Chinese Second Office Action Issued in Patent Application No. 201210376181.9, dated Jul. 13, 2015, 13 Pages.

Chinese Second Office Action Issued in Patent Application No. 201210376206.5, dated Jun. 10, 2015, 10 Pages.

Chinese Sixth Office Action Received for Chinese Patent Application No. 200980131157.5, dated Dec. 11, 2014, 9 Pages.

Chinese Third Office Action dated Feb. 22, 2016 in Appln No. 201210382816.6, 10 pgs.

Chinese Third Office Action dated Oct. 28, 2015 in Appln No. 201210376206.5, 3 pgs.

Fourth Office Action Issued in Chinese Patent Application No. 201210382816.6, dated Sep. 1, 2016, 6 Pages.

Office Action Issued in Chinese Patent Application No. 201110436635.2, dated Apr. 1, 2016, 9 Pages.

Office Action Issued in Chinese Patent Application No. 201110436635.2, dated Jul. 28, 2016, 9 Pages.

(56) References Cited

OTHER PUBLICATIONS

Office Action Issued in Chinese Patent Application No. 201110436635.2, dated May 18, 2015, 13 Pages.
Office Action Issued in Chinese Patent Application No. 201110436635.2, dated Oct. 20, 2015, 10 Pages.
Office Action Received for Chinese Patent Application No. 200980131157.5, dated Jul. 6, 2015, 9 Pages.
"Microsoft Word's Click and Type Feature", published by SnipTools, Nov. 12, 2003 downloaded Jun. 28, 2015 from http://sniptools.com/vault/microsoft-words-click-and-type-feature; 2 pgs.
"The Platinum Experience of Collaboration—CollaboratorHYPERMAX", Retrieved Date: Jul. 16, 2010, http://www.businessoctane.com/group_telepresence.php, 7 pgs.
"The Screen Capture Tool" by Help and Manual, archived Mar. 13, 1006 by the Internet Wayback Machine, downloaded Nov. 28, 2016, 3 pages, from https://web.archive.org/web/20060313150929/http://www.helpandmanual.com/help/help_toc.html?hm_advanced_tools_capture.
Gallegos, D., et al. "CounterPoint User Manual" class project for Charles Paine at the University of New Mexico, Downloaded from Archive. Org 2005 capture, http://web.archive.org/web/20050205082738/www.cs.umd.edu/hcil/counterpoint/, 21 pgs.
Rudnicky, Alexander I., et al., "Intelligently Integrating Information from Speech and Vision to Perform Light-weight Meeting Understanding", retrieved from http://citeseerx.ist.psu.edu/viewdoc/download?doi=10.1.1.126.1733&rep=rep1&type=pdf. (Oct. 2005), 6 pages.
Office Action dated Oct. 4, 2016, in U.S. Appl. No. 13/271,148, 20 pgs.
Office Action dated Oct. 4, 2016, in U.S. Appl. No. 13/272,832, 22 pgs.
Notice of Allowance dated Aug. 10, 2016, in U.S. Appl. No. 13/253,886, 22 pgs.
Notice of Allowance dated Mar. 1, 2016, in U.S. Appl. No. 12/968,287, 13 pgs.
Office Action dated Apr. 10, 2015, in U.S. Appl. No. 12/472,101, 14 pgs.
Office Action dated Apr. 20, 2015, in U.S. Appl. No. 13/272,832, 18 pgs.
Office Action dated Apr. 20, 2016, in U.S. Appl. No. 13/271,148, 19 pgs.
Office Action dated Dec. 1, 2016, in U.S. Appl. No. 12/184,174, 17 pages.
Office Action dated Dec. 20, 2013, in U.S. Appl. No. 12/965,965, 19 pages.
Office Action dated Dec. 4, 2014, in U.S. Appl. No. 13/271,148, 56 pgs.
Office Action dated Sep. 30, 2010, in U.S. Appl. No. 11/260,515 18 pages.
Office Action dated Jan. 6, 2015, in U.S. Appl. No. 13/253,886, 43 pgs.
Office Action dated Jul. 17, 2015, in U.S. Appl. No. 13/271,148, 18 pgs.
Office Action dated Jul. 18, 2014, in U.S. Appl. No. 14/225,234, 25 pgs.
Office Action dated Jul. 7, 2015, in U.S. Appl. No. 12/184,174, 17 pgs.
Office Action dated Jul. 9, 2015, in U.S. Appl. No. 13/253,886, 13 pgs.
Office Action dated Jun. 17, 2016, in U.S. Appl. No. 14/225,234, 11 pgs.
Office Action dated Mar. 10, 2015, in U.S. Appl. No. 14/225,234, 10 pgs.
Office Action dated Oct. 31, 2014, in U.S. Appl. No. 13/272,832, 17 pgs.
Office Action dated Mar. 13, 2012, in U.S. Appl. No. 12/184,174, 20 pages.
Office Action dated Mar. 21, 2016, in U.S. Appl. No. 12/472,101, 14 pgs.
Office Action dated Mar. 3, 2016, in U.S. Appl. No. 12/184,174, 16 pgs.
Office Action dated Mar. 4, 2016, in U.S. Appl. No. 13/272,832, 27 pgs.
Office Action dated Oct. 6, 2016, in U.S. Appl. No. 14/225,234, 11 pgs.
Office Action dated Oct. 8, 2015, in U.S. Appl. No. 14/225,234, 11 pgs.
Office Action dated Sep. 16, 2015, in U.S. Appl. No. 13/272,832, 17 pgs.
Office Action dated Sep. 22, 2015, in U.S. Appl. No. 12/472,101, 9 pgs.
Office Action dated Feb. 9, 2017, in U.S. Appl. No. 13/271,148, 19 pgs.
Office Action dated Mar. 10, 2017, in U.S. Appl. No. 13/272,832, 18 pgs.
Advisory Action dated Feb. 7, 2017, in U.S. Appl. No. 14/225,234, 3 pgs.
Office Action dated Feb. 27, 2017, in U.S. Appl. No. 12/967,497, 26 pgs.
Office Action Issued in European Patent Application No. 09803312.9, dated Feb. 17, 7 pages.
Decision on Reexamination Issued in Chinese Patent Application No. 201210376206.5, dated Jun. 1, 2017, 18 pages.
Notice of Allowace Issued in Chinese Patent Application No. 201210376181.9, dated Mar. 1, 2017, 4 pages.
Notification of Reexamination Issued in Chinese Patent Application No. 201110436635.2, dated Apr. 27, 2017, 14 pages.
Office Action dated Jun. 5, 2017, in U.S. Appl. No. 14,225,234, 11 pages.
Office Action dated Sep. 12, 2017, in U.S. Appl. No. 13/271,148, 18 pages.
Office Action dated Oct. 6, 2017, in U.S. Appl. No. 14/225,234, 12 pages.

\* cited by examiner

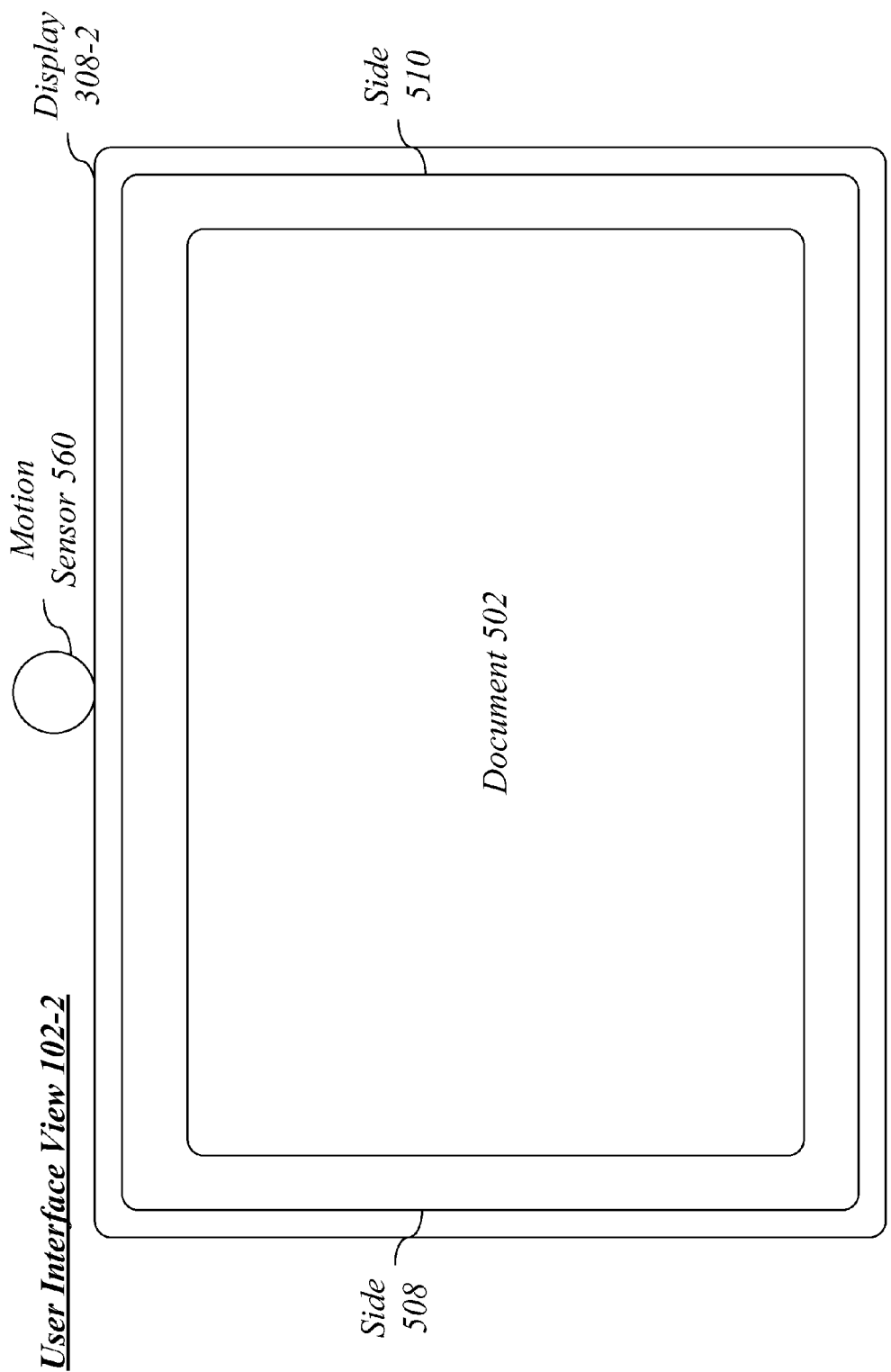

600

PRESENT A USER INTERFACE VIEW OF AN APPLICATION ON A FIRST DISPLAY FOR A DEVICE
602

DETECT A SECOND DISPLAY FOR THE DEVICE
604

CUSTOMIZE THE USER INTERFACE VIEW BASED ON AN ADAPTATION PARAMETER
606

PRESENT THE CUSTOMIZED USER INTERFACE VIEW ON THE SECOND DISPLAY
608

*FIG. 6*

TECHNIQUES TO CUSTOMIZE A USER INTERFACE FOR DIFFERENT DISPLAYS

BACKGROUND

A software application typically utilizes a user interface specifically designed to allow a human user to interface with the software application. A user interface may generate one or more user interface views to present information from the software application for viewing by a user on an output device such as a display, and also to receive control directives or commands from a user via an input device to control, navigate and interact with various features provided by the software application. In some cases, a device may be attached to multiple output devices, such as a laptop computer with a laptop screen and external monitor, a personal computer with dual-monitors, or a conferencing server with connected devices each having a different display. In such cases, an application may generate a single user interface view for presentation on the multiple displays, which is typically duplicated on each additional display. However, a single user interface may not necessarily be appropriate for each display. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to custom user interfaces for different displays. Some embodiments are particularly directed to enhanced techniques for generating and presenting customized user interface views for providing interoperability with a software application, with each customized user interface view specifically designed for a given display. In other words, a single software application may present different customized user interface views with different user interface elements on different displays, either at a same time or different times.

In one embodiment, for example, an apparatus such as an electronic device with a processing system may implement a custom user interface system that when executed by a processor is operative to adapt a user interface view of an application for presentation by one or more displays, and in some cases, potentially across multiple computing devices. The custom user interface system may comprise, among other elements, a user interface adaptation component operative to receive as input a user interface view of the application for presentation on a first display and an adaptation parameter, and modify the user interface view for presentation on a second display based on the adaptation parameter. A presentation component is operative to present the customized user interface view on the second display. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 5D illustrates an embodiment of another user interface view.

FIG. 6 illustrates an embodiment of a logic flow.

DETAILED DESCRIPTION

Figure 1:
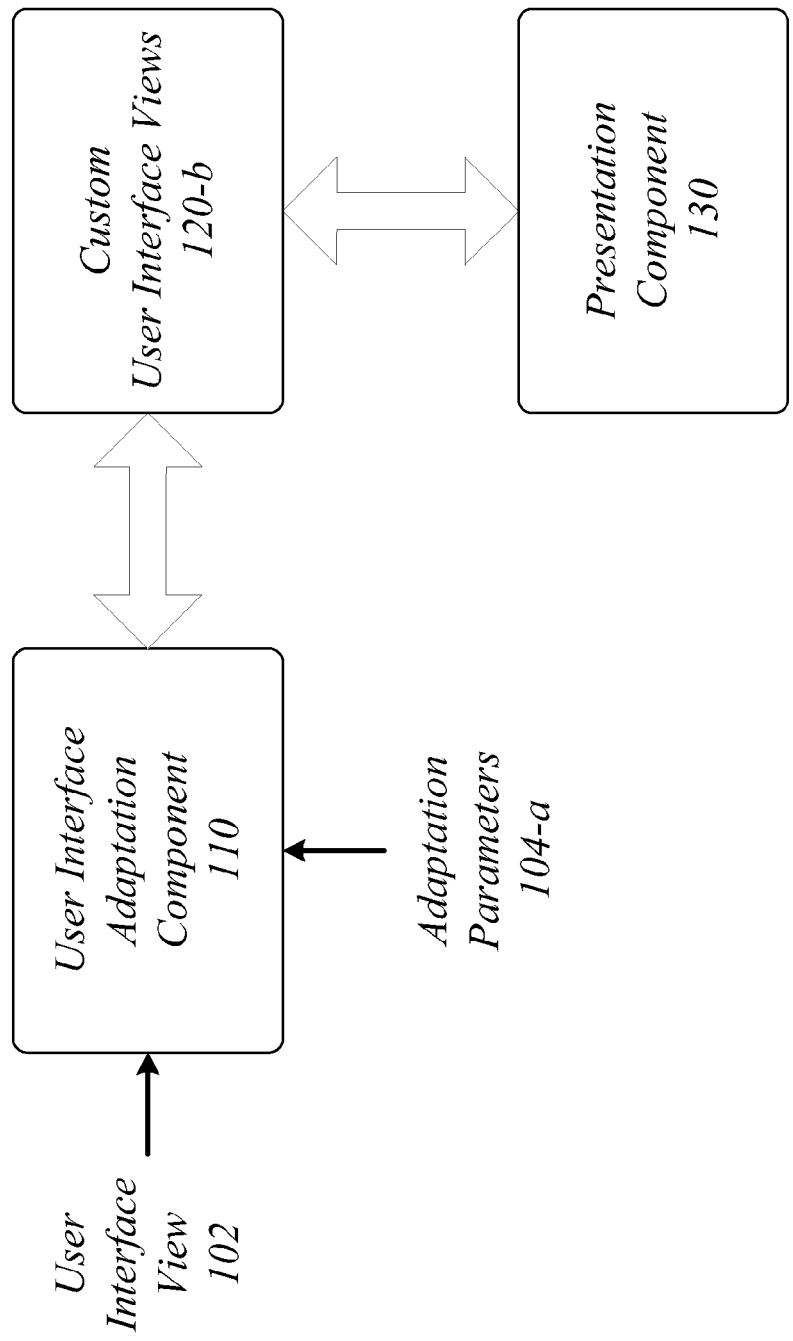
FIG. 1 illustrates an embodiment of a custom user interface system.

Conventional techniques allow an application to generate a single user interface view for presentation on multiple displays, with the single user interface view corrected for varying physical characteristics of a display, such as size, color, resolution, and so forth. For instance, assume a first display has a smaller dimension than a second display. An application may generate a single user interface view that is scaled for both displays, with a smaller version for the smaller display and a larger version for the larger display. In both cases, the user interface elements used to construct the user interface view remain the same. However, each display may be used for different purposes. For instance, during a meeting, a smaller display may be used to read a document while a larger display is to present the same document to a number of meeting participants. In such cases, having a scaled version of a same user interface view may not be useful for both purposes. Various user interface elements, such as a toolbar, may be useful on a smaller display to allow a presenter to manipulate a document, but may be a distraction to viewers when presented on the larger display. As such, multiple displays presenting scaled versions of a single user interface view may not be desirable for all potential scenarios.

To solve these and other problems, various embodiments are directed to enhanced techniques for automatically generating, modifying and presenting customized user interface views useful for providing interoperability with a software application, with each customized user interface view specifically designed for a given display. In other words, a single software application may present different customized user interface views with different user interface elements on different displays, either at a same time or different times. Further, the different customized user interface views may be automatically generated based on various adaptation parameters, such as a location of a user, among other adaptation parameters discussed more fully below.

In one embodiment, this may be accomplished using a custom user interface system. The custom user interface system may be implemented as part of an application program (e.g., a word processor, spreadsheet, etc.) or a system program (e.g., an operating system). Additionally or alternatively, the custom user interface system may be designed as a standalone software component interoperable with an application program or a system program. The custom interface component may receive content to be displayed by a user interface view for an application program, and generates customized user interface views to display the received content based on one or more adaptation parameters suitable for one or more displays used with the application. The user interface view and each customized user interface view may utilize different sets of user interface elements suitable for a given display. For instance, each set of user interface elements may have one or more mutually exclusive user interface elements. It may be appreciated, however, that in some cases different user interface views may share a certain number of user interface elements in common that are needed for all the user interface views.

In one embodiment, an apparatus such as an electronic device with a processing system may implement a custom user interface system that is operative to adapt a user interface view of an application for presentation by a display. The custom user interface system may comprise a user interface adaptation component operative to receive as input a user interface view of an application for a first display, and one or more adaptation parameters. The custom user interface system may generate one or more customized user interface view (e.g., versions of the user interface view) for the application for presentation on a second display. The user interface view may have a first set of user interface elements, and the customized user interface may have a second set of user interface elements selected based on one or more adaptation parameters. The second set of user interface elements may be different from the first set of user interface elements. The custom user interface system may further comprise a presentation component operative to present the user interface view and the customized user interface view for the application on the respective first and second displays. Other embodiments are described and claimed.

FIG. 1 illustrates a block diagram for a custom user interface system 100. In one embodiment, for example, the custom user interface system 100 may comprise a computer-implemented component having multiple components 110, 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the custom user interface system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a gaming device, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the custom user interface system 100 as shown in FIG. 1 has a limited number of elements in a certain topology, it may be appreciated that the custom user interface system 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, an apparatus such as an electronic device with a processing system may implement a custom user interface system 100 generally arranged to dynamically and automatically modify, adapt or customize content for a user interface view 102 of an application for presentation by a display, with each customized user interface view 120-*b* specifically designed for a given display. In this manner, a single software application may present different customized user interface views 120-*b* each having a different set of user interface elements on different displays. The different customized user interface views 120-*b* may be presented at either a same time or different times with the user interface view 102 or each other.

In the illustrated embodiment shown in FIG. 1, the custom user interface system 100 may comprise a user interface adaptation component 110 and a presentation component 130. The custom user interface system 100 may be generally arranged to generate various customized user interface views 120-*b*. The presentation component 130 may be generally arranged to present the user interface view 102 and any customized user interface views 120-*b* on various electronic displays, with each customized user interface view 120-*b* customized for a corresponding display.

The user interface adaptation component 110 may receive as input a user interface view 102 for a software program, such as an application program or a system program. The user interface view 102 may comprise various user interface elements specifically arranged to provide interoperability with a given software program. For instance, a user interface view 102 may include a toolbar, icons, control buttons, drop down menus, a document, multimedia information, and so forth. A user may use various input devices to interact with the user interface view 102 and control various aspects and operations of the software application. The user interface view 102 may be a user interface view built and ready for presentation by a display. Alternatively, the user interface view 102 may be a user interface view that is already presented by a display.

The user interface adaptation component 110 may also receive as input one or more adaptation parameters 104-*a*. The adaptation parameters 104-*a* may comprise values used to modify the user interface view 102 for a given display. In one embodiment, an adaptation parameter 104-1 may represent a physical characteristic of a display. Examples of physical characteristics of a display may include screen resolution, screen size, screen shape, operating frequency, refresh rate, and so forth. In one embodiment, an adaptation parameter 104-2 may represent a control directive of a user. Examples of control directives may include signals received from an input device (e.g., a keyboard, pointer, touch screen, etc.) initiated by a user. For instance, a user may manually change one or more user interface elements for the user interface view 102 (e.g., remove a toolbar). In one embodiment, an adaptation parameter 104-3 may represent a location of a user. For instance, measurements of a distance between a user location and a display may be made on a periodic, aperiodic or continuous basis. It may be appreciated that these are merely a few examples of adaptation parameters 104-*a*, and others may be used for alternative implementations. The embodiments are not limited in this context.

It is worthy to note that "a" and "b" and "c" and similar designators as used herein are intended to be variables representing any positive integer. Thus, for example, if an implementation sets a value for a=5, then a complete set of adaptation parameters 104-*a* may include adaptation parameters 104-1, 104-2, 104-3, 104-4 and 105-5. The embodiments are not limited in this context.

In operation, the custom user interface system 100 may receive as input a user interface view 102 of an application for presentation on a first display and one or more adaptation parameters 104-*a*. The custom user interface system 100 may modify or customize the user interface view 102 to create a customized user interface view 120-*b* suitable for presentation on a second display based on the adaptation parameters 104-*a*.

In various embodiments, a customized user interface view 120-*b* may have different user interface elements from those used by a given user interface view 102. In one embodiment, a user interface view 102 may have a first set of user interface elements, while a customized user interface view 120-1 may have a second set of user interface elements different from the first set of user interface elements. For instance, assume a user interface view 102 comprises a user interface for a word processing application, and has a first set of user interface elements that includes a document that is ready for editing, a toolbar, a page count, a word count, and a zoom control. The customized user interface view 120-1 may comprise a second set of user interface elements that includes all of the first set of user interface elements, with the addition of a ruler. Alternatively, the customized user interface view 120-1 may comprise only a document and a zoom control. It is worthy to note that the first and second sets of user interface elements do not need to have completely different user interface elements, but rather only a single user interface element needs to be different between the two sets.

The user interface adaptation component 110 may generate one or more custom user interface views 120-*b* for a given user interface view 102 as needed for different displays based on adaptation parameters 104-*a*. The user interface adaptation component 110 may receive a different set of adaptation parameters 104-*a* for each customized user interface view 120-*b*.

In one embodiment, the user interface adaptation component 110 may receive an adaptation parameter 104-1 comprising a value representing a property for a display, such as a physical characteristic of a display. Examples of physical characteristics of a display may include screen resolution, screen size, screen shape, operating frequency, refresh rate, and so forth. For example, assume the adaptation parameter 104-1 is a value representing a height and/or width of a display. The user interface adaptation component 110 may compare the adaptation parameter 104-1 for a secondary display with stored height and/or width values associated with a primary display used for a user interface view 102 (or read in real time from the primary display or display adapter). The user interface adaptation component 110 may determine that the secondary display is larger than the primary display based on the comparison. Rather than simply scaling a size for the user interface view 102, the user interface adaptation component 110 may modify various user interface elements from the user interface view 102 specifically for a larger display, such as those user interface elements suitable for viewers rather than those user interface elements suitable for a presenter. For instance, the user interface adaptation component 110 may increase font size beyond a scaled version of the original font size in the user interface view 102, to make text on a document more visually readable by a viewer at a distance. Similarly, the user interface adaptation component 110 may change a background color and text color to provide more contrast to enhance viewing of text on a document. The user interface adaptation component 110 may also remove user interface elements from the user interface view 102 that are not particularly useful or relevant to viewing rather than presenting, such as control user interface elements. In this manner, a user may use a laptop with a user interface view 102 with a document and editing user interface elements displayed on the laptop display, while a large touch display for a conference room attached to the laptop may have a customized user interface view 120-*b* with just the document and not any of the editing user interface elements. The customized user interface view 120-*b* may even enlarge the document for easier viewing at a distance by any meeting attendees in a conference room.

In one embodiment, the user interface adaptation component 110 may receive an adaptation parameter 104-2 comprising a value representing a control directive of a user. Examples of control directives may include signals received from an input device (e.g., a keyboard, pointer, touch screen, etc.) initiated by a user. For instance, rather than having the user interface adaptation component 110 automatically generate user interface elements for the customized user interface view 120-*b*, a user may manually select and change one or more user interface elements for the user interface view 102. Continuing with the previous example, a user may select editing user interface elements for the user interface view 102 on a laptop display, thereby allowing the user to edit a document during a meeting. The user may further deselect the editing user interface elements for the customized user interface view 120-*b* of a large touch display to enhance distance viewing by meeting participants in a conference room.

In one embodiment, the user interface adaptation component 110 may receive an adaptation parameter 104-3 comprising a value representing a location of a user relative to a display. For instance, measurements of a distance between a user location and a display may be made on a periodic, aperiodic or continuous basis. The measurements may be used to determine which user interface elements of a user interface view 102 are appropriate for a display proximate to the user. Continuing with the previous example, the user interface adaptation component 110 may receive an adaptation parameter 104-3 on a periodic basis indicating a distance between the user and the display. The user interface adaptation component 110 may select one set of user interface elements for a customized user interface view 120-b of large touch display based on the distance. For instance, user interface elements for editing tools may appear as a user moves closer to a display, and disappear as a user moves away from a display. In another example, user interface elements for editing tools may move from one side of a display to another side of a display based on which side the user is closer to a given moment in time.

In one embodiment, the user interface adaptation component 110 may receive an adaptation parameter 104-4 comprising a value representing components for a display. A display device may have one or more components providing additional capabilities beyond a display screen, such as a video camera, array microphone, touch sensors, motion sensors, speakers, and so forth. A computing device may typically access such capabilities, for example, via a USB interface or similar interface. The presence of such components could also influence displayed functionality and use of the display. For instance, the user interface adaptation component 110 may detect touch sensors implemented for a display, and generate a customized user interface view 120-b with user interface control elements for the touch sensor.

The presentation component 130 may present the customized user interface view 120-b on the second display. In one embodiment, the presentation component 130 may present the customized user interface view 120-b of the application on the second display at a same time as the user interface view 102 of the application is presented on the first display. In one embodiment, the presentation component 130 may present the customized user interface view 120-b of the application on the second display at a different time as the user interface view 102 of the application is presented on the first display. The presentation component 130 may be implemented as part of a main processing system for a computing device, or in a dedicated processing system such as a display adapter for one or more displays used with the main processing system of the computing device.

Figure 2:
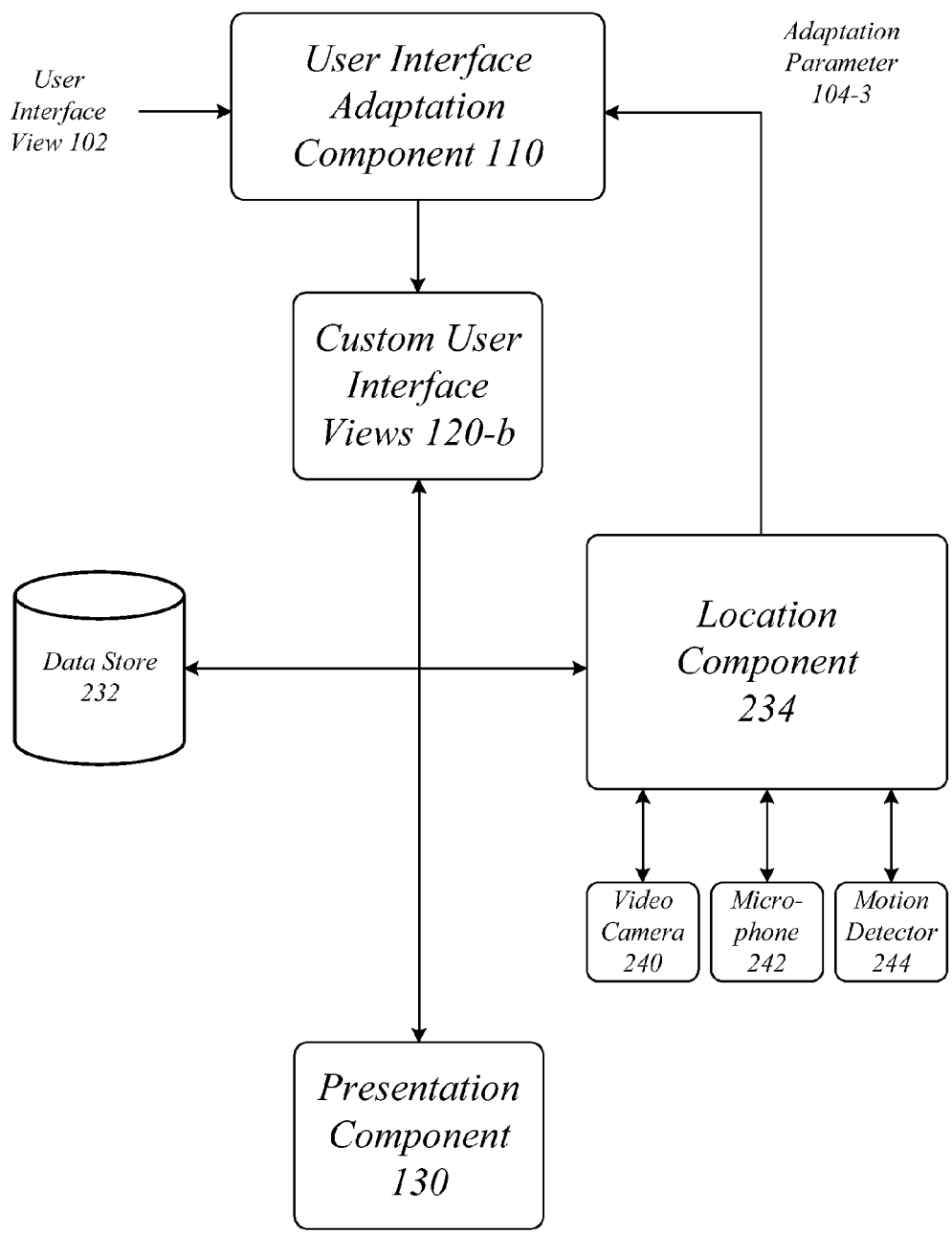
FIG. 2 illustrates an embodiment of a custom user interface system as shown in FIG. 1 with additional elements.

FIG. 2 illustrates a more detailed block diagram of the user interface adaptation component 110. In the illustrated embodiment shown in FIG. 2, the user interface adaptation component 110 may further comprise a data store 232 and a location component 234. The location component 234 may be coupled to various input devices, including a video camera 240, a microphone 242, and a motion detector 244. It may be appreciated that the user interface adaptation component 110 may include more or less elements as desired for a given implementation. For instance, other input devices may include various biometric sensors for a human. The embodiments are not limited in this context.

The datastore 232 may comprise a database storing information for the custom user interface system 100. The datastore 232 may comprise a local datastore implemented on a same device as the custom user interface system 100, or a remote datastore implemented on a different device from a device executing the custom user interface system 100. The datastore 232 may store information useful for the custom user interface system 100, such as information associated with a given application, a given computing system, a given display, a given display adapter, user interface elements, user interface templates, customized user interface templates, historical information, movement patterns, user preferences, user profiles, customization rules, and so forth. For instance, the datastore 232 may store specifications for each display attached to a device, such as screen size or resolution. Alternatively, some devices natively share capabilities, such as when attaching a device via a digital visual interface (DVI) cable, or attaching a USB monitor with cameras or sensors. In such cases, the datastore 232 may be an optional component.

The location component 234 may be arranged to determine a location of a user relative to a display, and encode the location as an adaptation parameter 104-3. The location component 234 may determine a location for a user based on information received from the video camera 240, the microphone 242 and/or the motion detector 244. Additionally or alternatively, the location component 234 may track a location for a user based on a device carried by the user, such as a smart phone. In this case, the location component 234 may automatically retrieve location information from a GPS device, cellular tower triangulation, wireless data network node detection, or similar location detection techniques. In addition to location of a user, the location component 234 may specifically be arranged to identify location of various body parts of a user, such as a user's arms, for motion capture gestures and other motion-based user interfaces.

The location component 234 may determine a location by analyzing video information received from the video camera 240. For instance, the video camera 240 may provide continuous video or periodic images to the location component 234 having images of a user and a display device. The location component 234 may measure a distance between the user and the display device, and encode the measured distance as the adaptation parameter 104-3. Additionally or alternatively, the location of a display device or other furniture and equipment within a conference room may be stored in the datastore 232, and the location component 234 may estimate distance of a user from a display device based on proximity to known locations within the conference room.

The location component 234 may determine a location by analyzing audio information received from the microphone 242. For instance, the microphone 242 may record sounds from the user, and use acoustic location techniques to determine a distance and direction for a user relative to a display device.

The location component 234 may determine a location by analyzing motion information received from the motion detector 244. For instance, the motion detector 244 may scan for movement of a user, and use motion detection techniques to determine a distance and direction for a user relative to a display device.

The user interface adaptation component 110 may receive an adaptation parameter 104-3 from the location component 234, and generate a customized user interface view 120-b based on the received adaptation parameter 104-3. For instance, assume a display is a large touch display with touch sensors. The user interface adaptation component 110 may adjust various control user interface elements of a user interface view 102 based on proximity to one side or another side of the large touch display to make it more convenient for a user to control an application. In another example, the user interface adaptation component 110 may adjust font size as a user moves away from the large touch display to allow the user to better see a document on the user interface view 102. In yet another example, the user interface adaptation component 110 may remove control user interface elements completely as a user moves away from the large touch display since the user will not be capable of using the touch screen.

Figure 3:
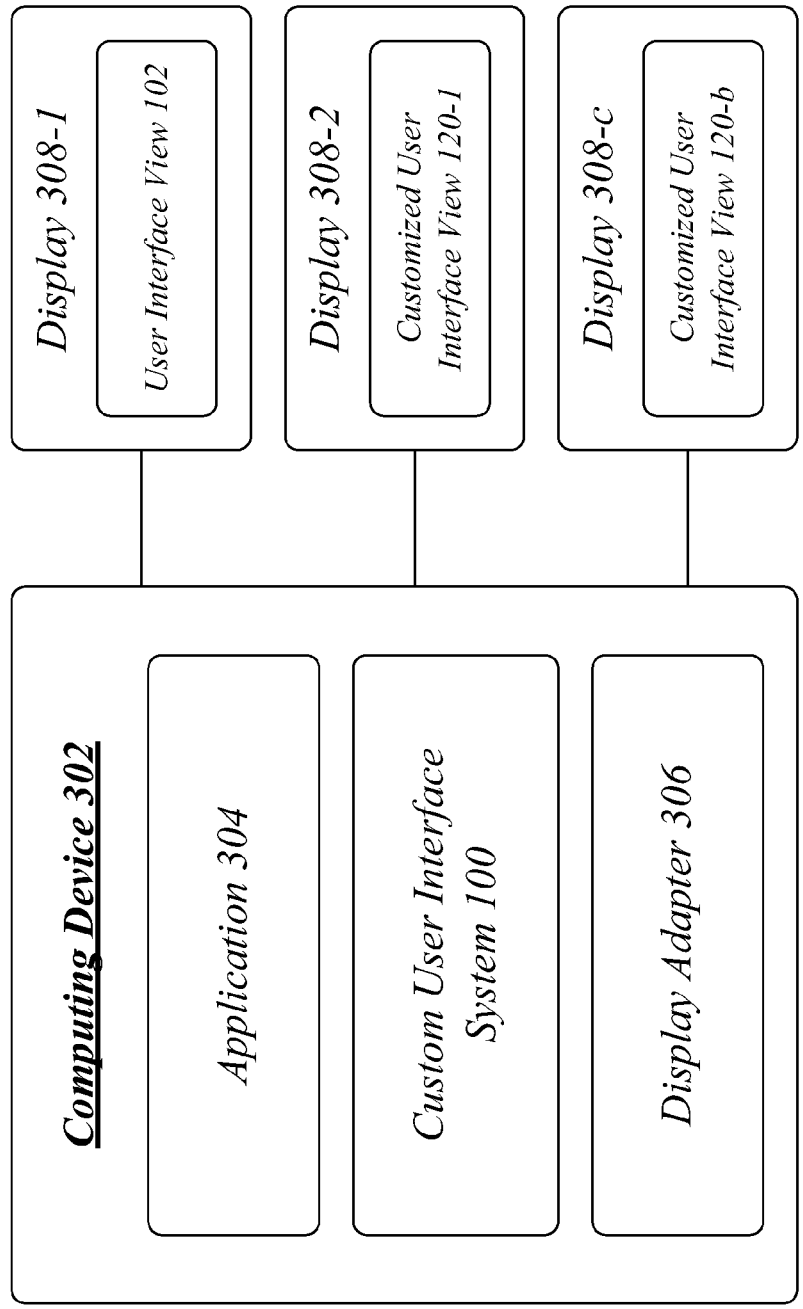
FIG. 3 illustrates an embodiment of a system implementing a custom user interface system as shown in FIGS. 1, 2 with simultaneous presentations.

FIG. 3 illustrates a block diagram of a system 300. The system 300 may comprise a computing device 302 communicatively coupled to multiple displays 308-c arranged to perform various operations in accordance with the described embodiments. For example, the computing device 302 may implement the custom user interface system 100 to generate customized user interface views 120-b for each of the displays 308-c.

The computing device 302 may include without limitation any of the electronic devices as described with reference to FIG. 1 having a processing system. In the illustrated embodiment shown in FIG. 3, the computing device 302 may comprise an application 304, the custom user interface system 100, and a display adapter 306. It may be appreciated that the computing device 302 may comprise more or less elements as desired for a given implementation.

The multiple displays 308-c may each comprise any electronic display for presentation of visual, tactile or auditive information. Examples for a display 308-c may include without limitation a cathode ray tube (CRT), bistable display, electronic paper, nixie tube, vector display, a flat panel display, a vacuum fluorescent display, a light-emitting diode (LED) display, electroluminescent (ELD) display, a plasma display panel (PDP), a liquid crystal display (LCD), a thin-film transistor (TFT) display, an organic light-emitting diode (OLED) display, a surface-conduction electron-emitter display (SED), a laser television, carbon nanotubes, nanocrystal displays, a head-mounted display, and so any other displays consistent with the described embodiments. In one embodiment, a display 308-c may be implemented as a touchscreen display. A touchscreen display is an electronic visual display that can detect the presence and location of a touch within the display area. The touch may be from a finger, hand, stylus, light pen, and so forth. The embodiments are not limited in this context.

The custom user interface system 100 may generate customized user interface views 120-b for one or more of the displays 308-c. As shown, the presentation component 130 may present a customized user interface view 120-1 of the application 304 on a display 308-2 at a same time as the user interface view 102 of the application 304 is presented on a display 308-1. As previously described, the user interface view 102 may be a current user interface view for an application rendered for a primary display, while the customized user interface view 120-1 may be an adapted version of the user interface view 102 specifically customized for a secondary display. While the user interface view 102 and the customized user interface view 120-1 may share some user interface elements in common, each will have at least one different user interface element from the other (e.g., an added UI element, a removed UI element, a modified UI element, etc.). It may be appreciated that the custom user interface system 100 may generate any number of customized interface views 120-b for any number of displays 308-c. The embodiments are not limited in this context.

Figure 4A:
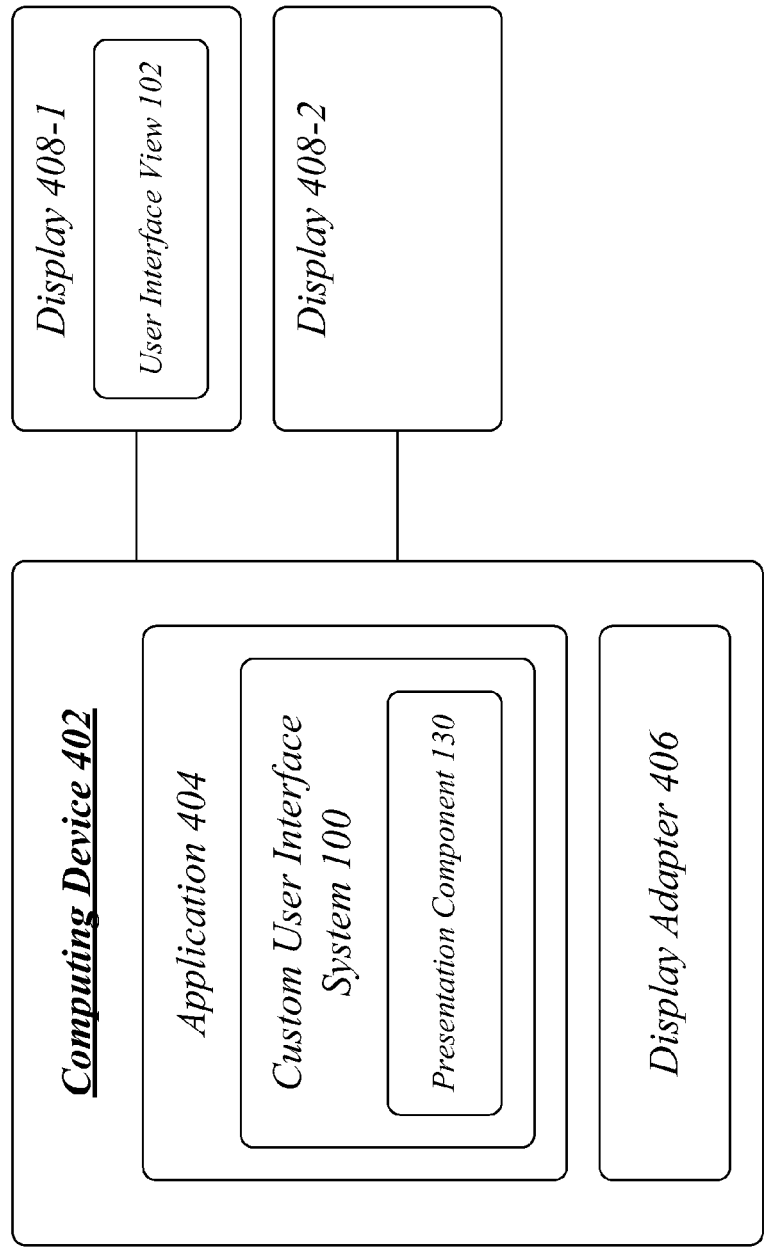
FIG. 4A illustrates an embodiment of a system implementing a user interface component as shown in FIGS. 1, 2 with a single display.
Figure 4B:
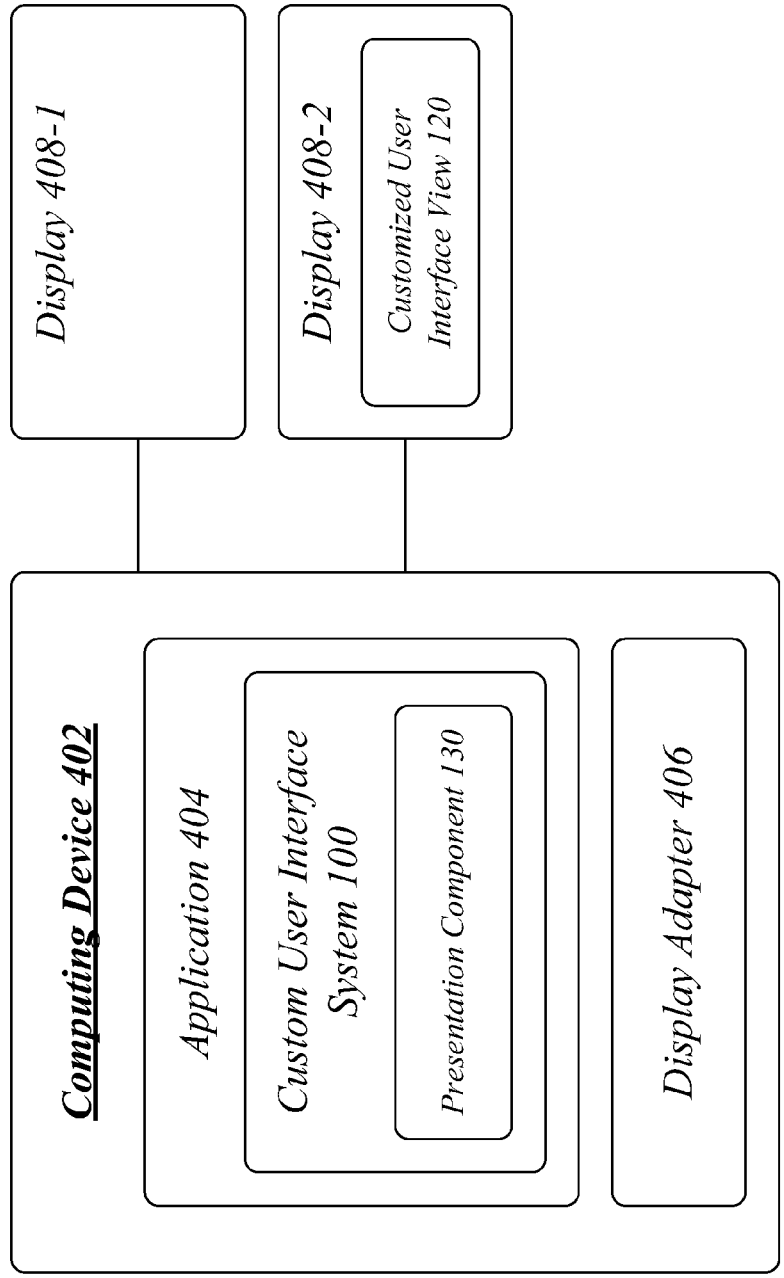
FIG. 4B illustrates an embodiment of a system implementing a custom user interface system as shown in FIGS. 1, 2 with a single display.

FIGS. 4A, 4B illustrate a block diagram of a system 400. The system 400 may comprise a computing device 402 communicatively coupled to multiple displays 408-d arranged to perform various operations in accordance with the described embodiments. For example, the computing device 402 may implement the custom user interface system 100 to generate customized user interface views 120-b for each of the displays 408-d. The computing device 402 and the multiple displays 408-d may be similar to corresponding computing device 302 and multiple displays 308-c as described with reference to FIG. 3.

The custom user interface system 100 may generate customized user interface views 120-b for one or more of the displays 408-d. In one embodiment, the presentation component 130 may present a customized user interface view 120-b of an application 404 on a display 408-2 at a different time as a user interface view 102 of the application 404 is presented on a first display 408-1. As shown in FIG. 4A, the presentation component 130 may present a user interface view 102 of the application 404 on a display 408-1, while the display 408-2 is blank or turned off. As shown in FIG. 4B, the presentation component 130 may present a customized user interface view 120 of the application 404 on the display 408-2, while the display 408-1 is blank or turned off.

By way of example, assume a user has two different displays attached to a device, with each display on opposite sides of a conference room. When the user moves towards the display 408-1, the presentation component 130 may turn on the display 408-1 and present the user interface view 102. The presentation component 130 may turn off the display 408-2 to converse power or improve audience focus. As the user moves toward the display 408-2, the presentation component 130 may turn off the display 408-1, and turn on the display 408-2 and present the customized user interface view 120.

Figure 5A:
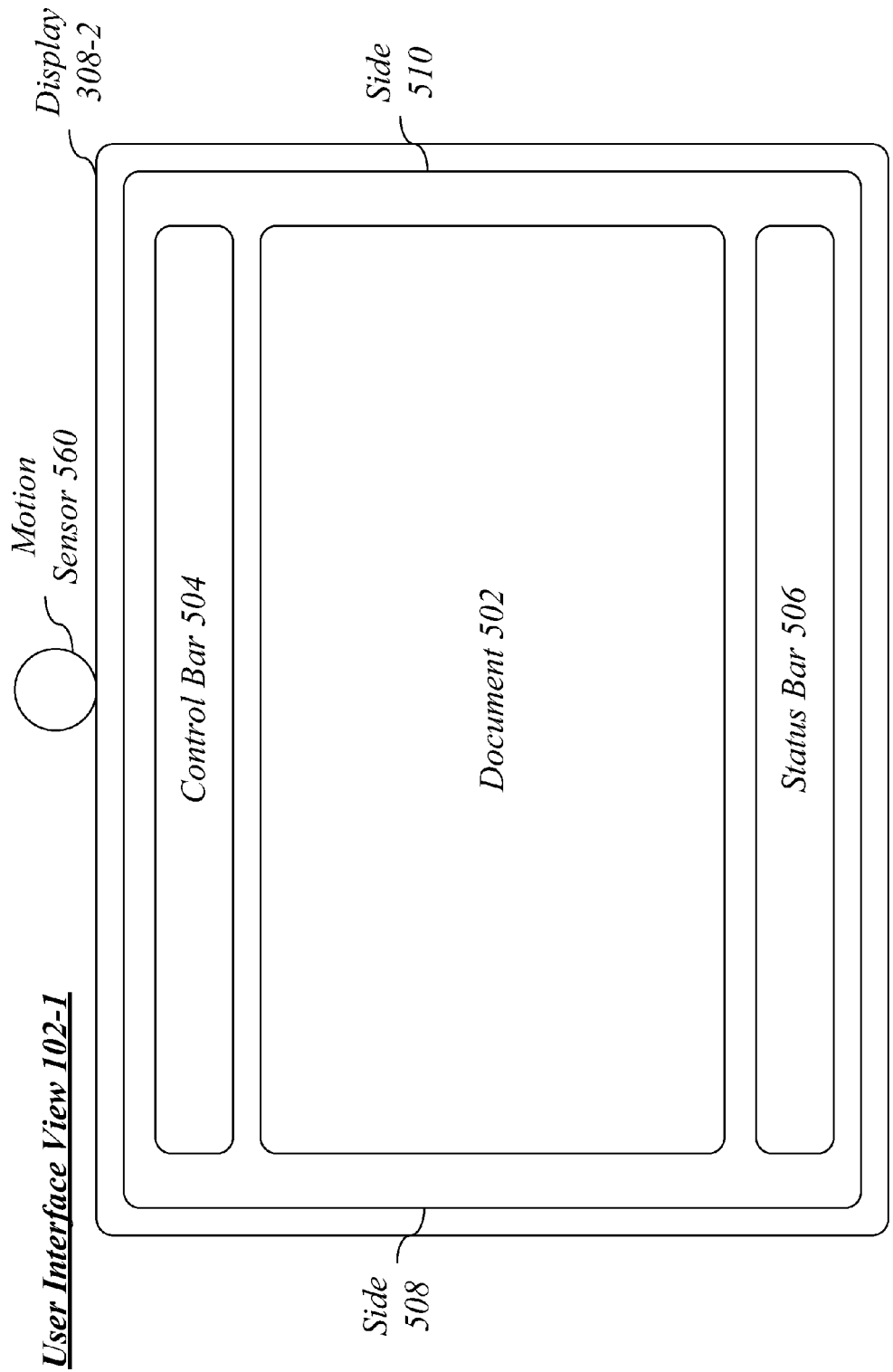
FIG. 5A illustrates an embodiment of a user interface view.

FIG. 5A illustrates an exemplary customized a user interface view 102. FIG. 5A illustrates a display 308-2 having a motion sensor 560 to display a user interface view 102-1 for an application program 304, 404. Assume the application program 304 comprises a word processing application, and user interface view 102-1 comprises a specific user interface view for the word processing application. As shown, the user interface view 102 comprises various user interface elements, including a document 502, a control bar 504, and a status bar 506. Further assume the user interface view 102-1 is presented on the display 308-1, which is a display for a laptop computer.

Figure 5B:
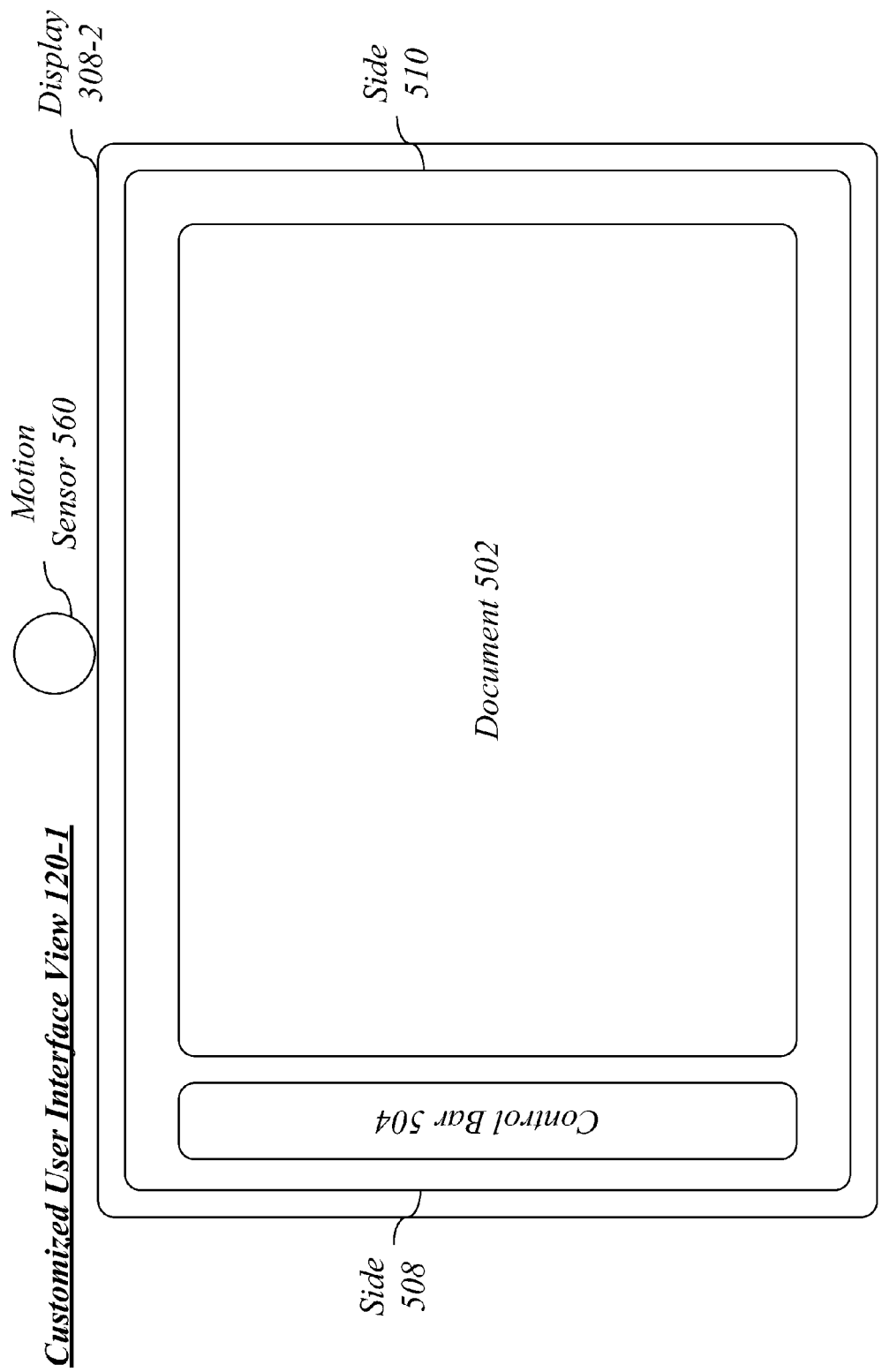
FIG. 5B illustrates an embodiment of a first customized user interface view.

FIG. 5B illustrates an exemplary customized user interface view 120-1. FIG. 5B illustrates the user interface view 102-1 after adaptation by the user interface adaptation component 110 to generate a customized user interface view 120-1 of the user interface view 102-1. Assume the customized user interface view 120-1 is presented on the display 308-2, which is a large touch display with cameras and touch sensors in a conference room. Further assume the display 308-2 has a motion sensor 560 to detect motion of a user, including a user's body parts, such as hand waving for gesture based control of the customized user interface view 120-1. Since the display 308-2 is a large touch display designed for viewing by various attendees of a meeting in the conference room, the customized user interface view 120-1 maintains the main focus user interface elements of the document 502 and the control bar 504. However, the customized user interface view 120-1 removes the status bar 506 to further enlarge the document 502 and enhance focus on the document 502, and does this based on detected properties and capabilities of the display 308-2. Note that the customized user interface view 120-1 is not simply a scaled larger version of the user interface view 102, but rather is an enlarged user interface view with different user interface elements suitable for the display 308-2. Hence, removal of the status bar 506 from the customized user interface view 120-1 is appropriate in this context.

Further assume the user interface adaptation component 110 receives an adaptation parameter 104-3 generated by the motion sensor 560 indicating that a user location is near a side 508 of the display 308-2. The user interface adaptation component 110 may generate the customized user interface view 120-1 of the user interface view 102-1 such that the control bar 504 is presented towards the side 508 of the display 308-2. This allows a presenter to more easily reach and utilize the touch sensors for managing the document 502 of the application 304.

Figure 5C:
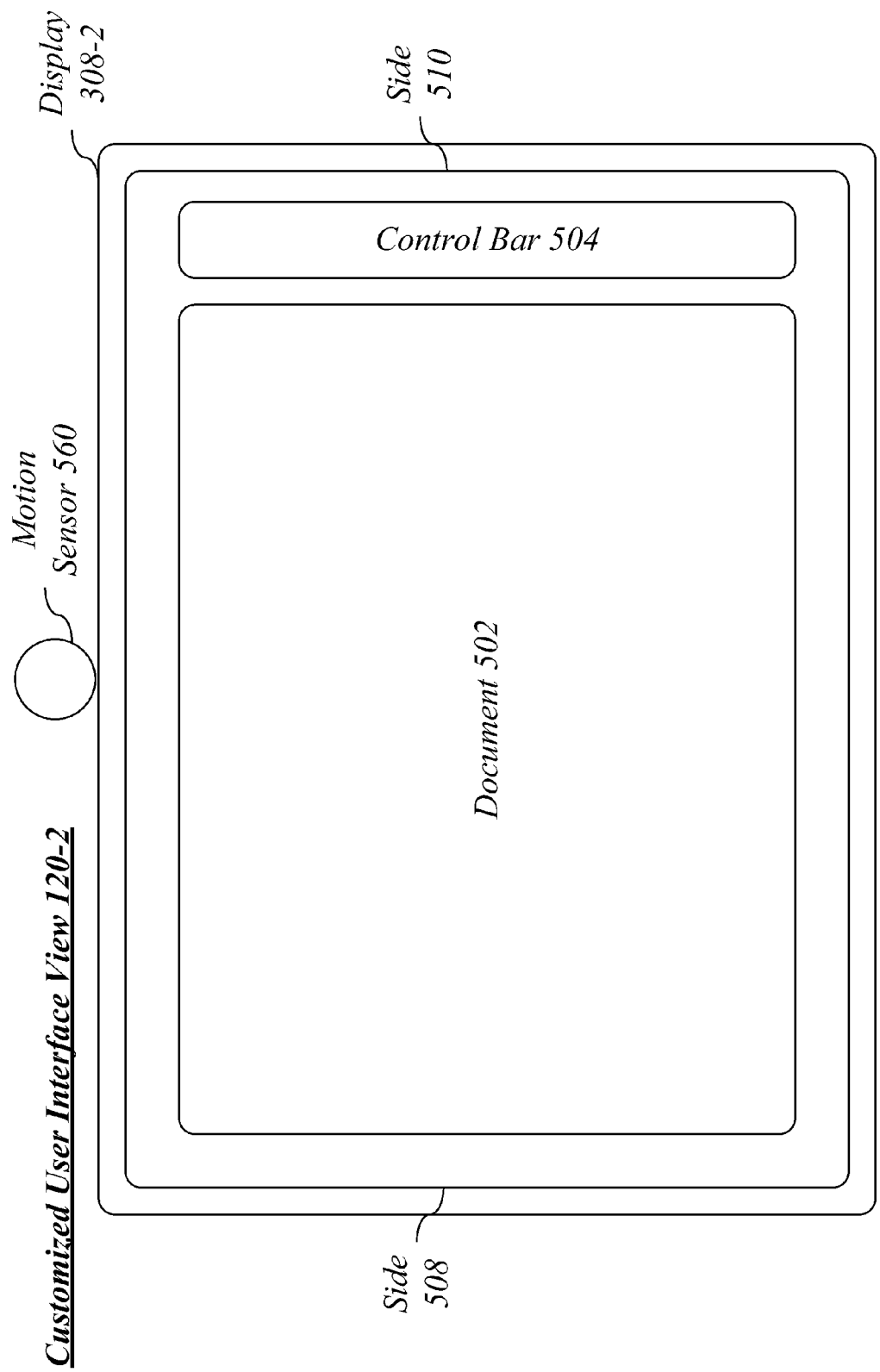
FIG. 5C illustrates an embodiment of a second customized user interface view.

FIG. 5C illustrates an exemplary customized user interface view 120-2. As with the customized user interface view 120-1, the customized user interface view 120-2 is customized for the display 308-1. However, sometime during a presentation the presenter moves towards the side 510 of the display 308-2, as detected by the motion sensor 560. The user interface adaptation component 110 receives an adaptation parameter 104-3 indicating that a user location is near a side 510 of the display 308-2 from the location component 234. The user interface adaptation component 110 may generate the customized user interface view 120-2 of the user interface view 102 such that the control bar 504 is presented towards the side 510 of the display 308-2. This allows a presenter to more easily reach and utilize the touch sensors for managing the document 502 of the application 304.

FIG. 5D illustrates an exemplary user interface view 120-2. FIG. 5D illustrates the user interface view 102-2 before adaptation by the user interface adaptation component 110. Since the display 308-2 is a large touch display designed for viewing by various attendees of a meeting in the conference room, the user interface view 102-2 maintains the main focus user interface element of only the document 502 when an adaptation parameter 104-3 generated by the motion sensor 560 indicates a user is beyond a defined distance from the display 308-2. This scenario allows for an example of adding user interface elements to the user interface view 102-2.

Figure 5E:
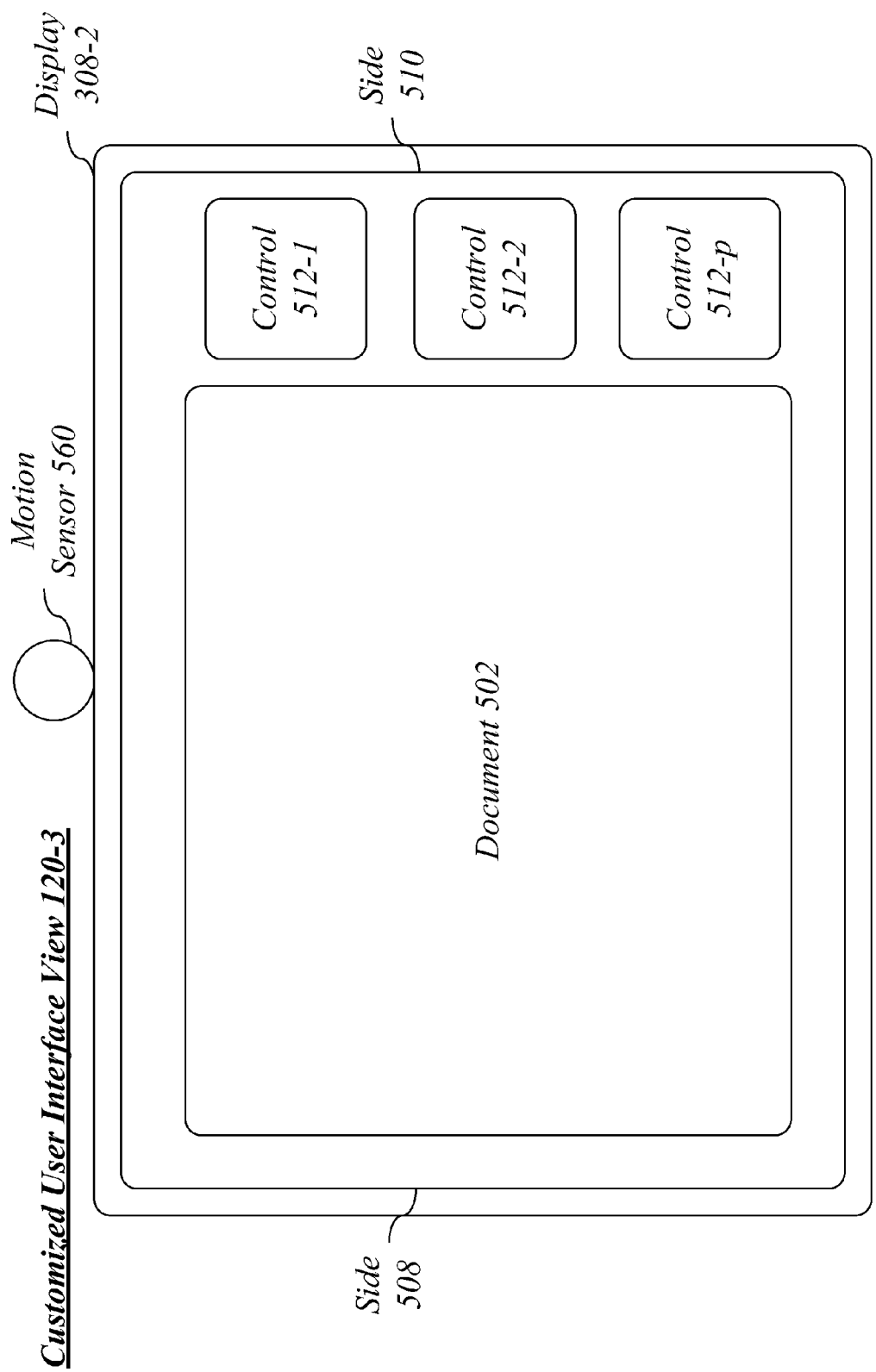
FIG. 5E illustrates an embodiment of another customized user interface view.

FIG. 5E illustrates an exemplary customized user interface view 120-3. FIG. 5E illustrates the user interface view 102-2 after adaptation by the user interface adaptation component 110. Assume the user interface adaptation component 110 receives an adaptation parameter 104-3 generated by the motion sensor 560 indicating that a user location is within a defined distance of the display 308-2, and further, is near the side 510 of the display 308-2. The user interface adaptation component 110 may generate a customized user interface view 120-3 of the user interface view 102-2 such that multiple control elements 512-1, 512-2 and 512-3 are presented towards the side 510 of the display 308-2. This allows a presenter to interact with the document 502 with a set of controls within easy reach of the user.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein, such as the user interface adaptation component 110 of the custom user interface system 100, for example.

In the illustrated embodiment shown in FIG. 6, the logic flow 600 may present a user interface view of an application on a first display for a device at block 602. For example, the presentation component 130 of the custom user interface system 100 may present a user interface view 102 of an application 304 on a first display 308-1 for a computing device 302.

The logic flow 600 may detect a second display for the device at block 604. For example, the display adapter 306 of the computing device 302 may detect a presence of additional displays available for the computing devices 302, such as the displays 308-2 through 308-c.

The logic flow 600 may customize the user interface view based on an adaptation parameter at block 606. For example, the user interface adaptation component 110 of the custom user interface system 100 may receive the user interface view 102 and one or more adaptation parameters 104-a, and customize the user interface view 102 based on the one or more adaptation parameters 104-a. In one embodiment, for example, the user interface adaptation component 110 may add, remove, modify, or move a user interface element of the user interface view 102 to generate a customized user interface view 120-b.

The logic flow 600 may present the customized user interface view on the second display at block 608. For example, the presentation component 130 may present a customized user interface view 120-1 on the second display 308-2 of the computing device 302.

In the various embodiments, it may be appreciated that a single device utilizing a single application may utilize multiple displays to present multiple user interface views, with the user interface views comprising different versions of a single user interface view. This is a significant improvement over other conventional computing systems utilizing multiple displays, where an application may generate a single user interface view for presentation on each of the multiple displays, with a user interface view scaled in size for a given display. In other words, each display has different user interface views synchronized across different display devices, rather than a tethering mode where a user interface view and any changes to a user interface view are simply replicated across all displays. The embodiments are not limited in this context.

Figure 7:
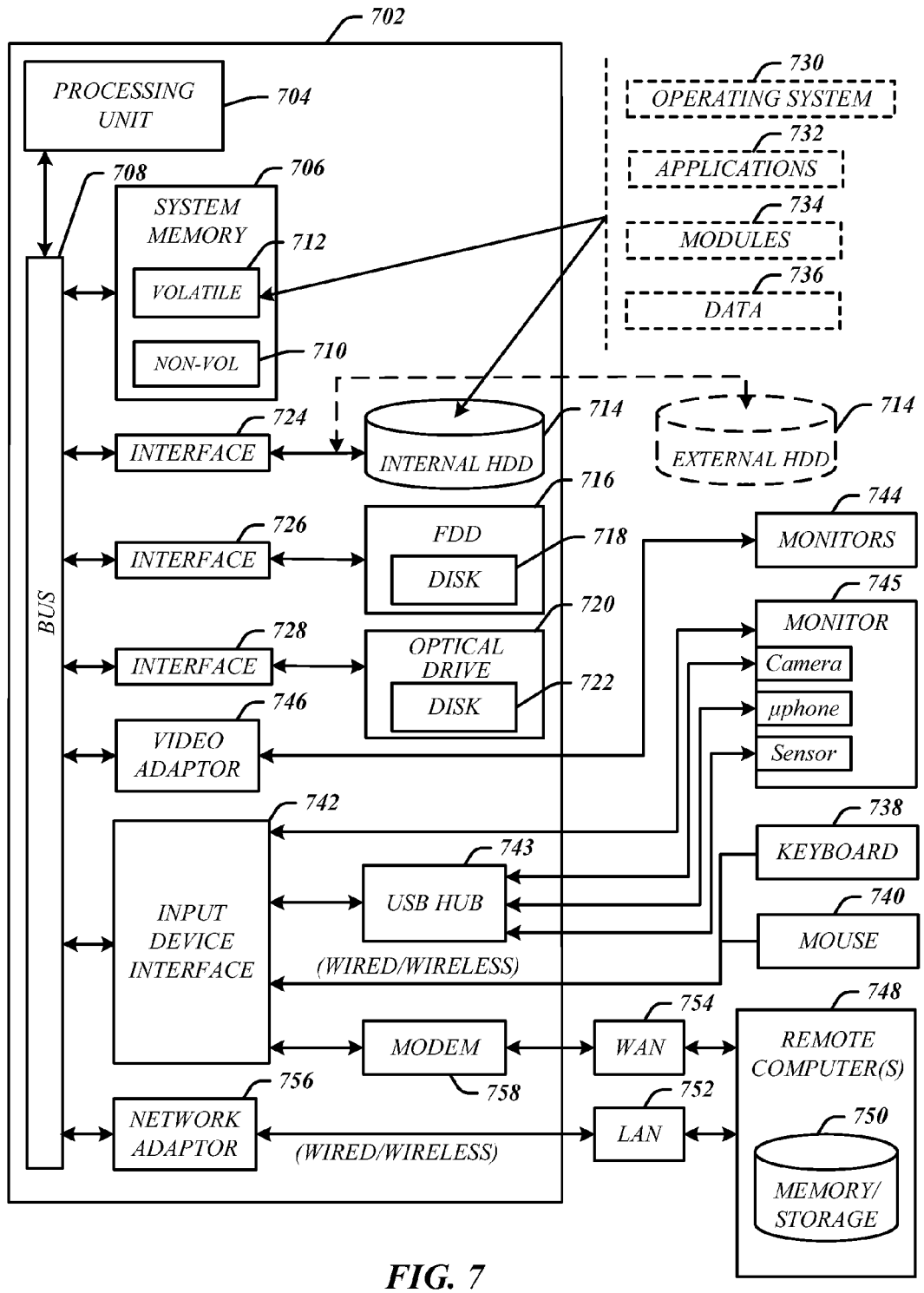
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the custom user interface system 100, the user interface adaptation component 110, the customized user interface views 120-b, the presentation component 130, the datastore 232, and the location component 234.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

One or more monitors 744 or other type of display devices are also connected to the system bus 708 via an interface, such as a video adaptor 746. In addition to the monitor 744, a computer typically includes other peripheral output devices, such as speakers, printers, and so forth. One or more monitors 745 may also be connected to the system bus 708 via an input device interface 742 and/or a hub, such as USB hub 743. The monitors 745 may comprise various components, such as a video camera, array microphone, touch sensors, motion sensors, speakers, and so forth. The components may be connected to the input device interface 742 via the USB hub 743.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
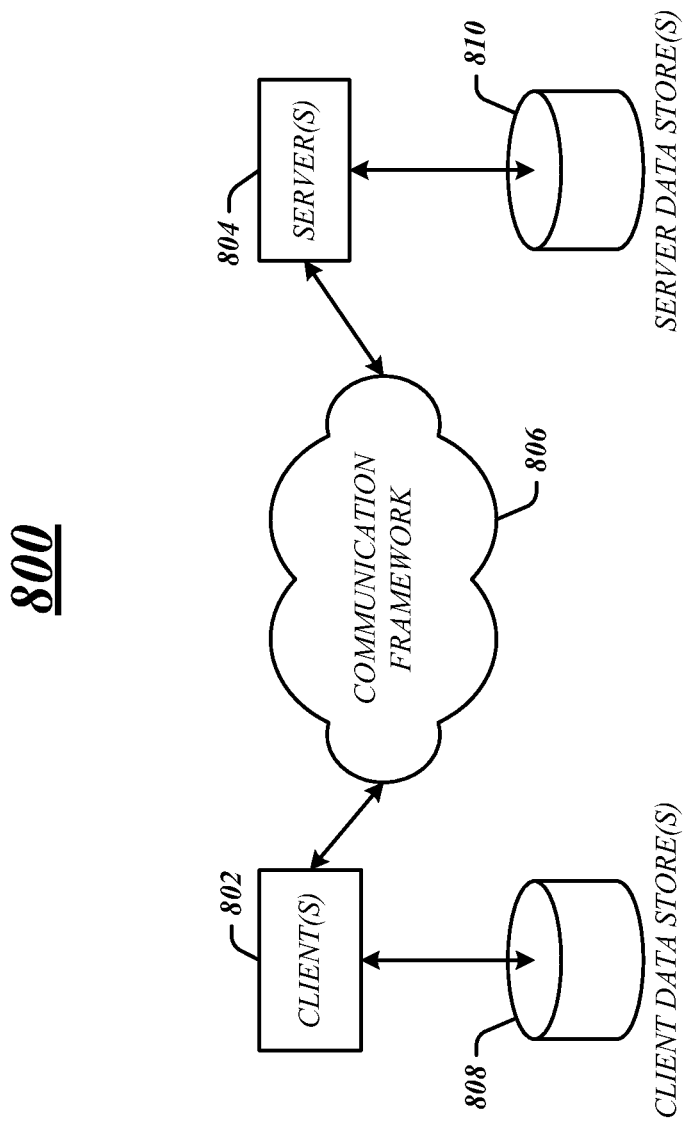
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a computer-readable storage medium arranged to store logic. Examples of a computer-readable storage media include any storage medium capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
  displaying a user interface view of an application on a first display of a device, the user interface view having a first set of user interface control elements and a content of the application;
  detecting a second display of the device, wherein the second display has a first area including a first side of the second display and a second area including a second side of the second display, where the first area and the second area of the second displayed do not overlap;
  customizing the user interface view of the application on the first display by generating a customized interface view based on an adaptation parameter,
    the customized user interface view having a second set of user interface control elements and the content of the application, wherein the second set of user interface control elements are different from the first set of user interface control elements, and wherein the user interface control elements are enabled to control operations of the application;
  displaying the customized user interface view of the application on the second display of the device at a same time as displaying the user interface view of the application on the first display of the device;
  receiving another adaptation parameter indicating that a user's location is closer to the second area than the first area of the second display; and
  in response to receiving the another adaptation parameter, modifying the customized user interface view by
  moving at least one of the user interface control elements of the second set of user interface control elements from a first location within the first area of the second display to a second location within the second area of the second display, where in the second location is closer to the user then the first location, while the content of the application is displayed on the first display and the second display and the location of the first set of user interface control elements on the first display remain unchanged; and
  displaying the modified customized user interface on the second display.

2. The computer-implemented method of claim 1, wherein customizing the user interface view further comprises adding an additional user interface control element to the user interface view.

3. The computer-implemented method of claim 1, wherein customizing the user interface view further comprises removing an additional user interface control element from the user interface view.

4. The computer-implemented method of claim 1, wherein customizing the user interface view further comprises modifying at least one of the user interface control elements of the user interface view.

5. The computer-implemented method of claim 1, wherein the adaptation parameter corresponds to a physical characteristic of the second display.

6. The computer-implemented method of claim 1, wherein the adaptation parameter corresponds to a control directive from the user.

7. The computer-implemented method of claim 1, wherein the adaptation parameter corresponds to an additional location of the user relative to the second display.

8. The computer-implemented method of claim 1, wherein the another adaptation parameter is generated by a motion sensor.

9. A computer storage hardware device containing instructions that, when executed by a processor, perform a method comprising:
  displaying a user interface view of an application on a first display of a device, the first user interface view having a first set of user interface elements and a content of the application;
  detecting a second display of the device, wherein the second display has a first area including a first side of the second display and a second area including a second side of the second display, where the first area and the second area of the second displayed do not overlap;
  customizing the user interface view of the application on the first display by generating a customized interface view based on an adaptation parameter,
    the customized user interface view having a second set of user interface control elements and the content of the application, wherein the second set of user interface control elements are different from the first set of user interface control elements, and wherein the user interface control elements are enabled to control operations of the application;
  displaying the customized user interface view of the application on the second display of the device at a same time as presenting the user interface view of the application on the first display of the device;
  receiving another adaptation parameter indicating that a user's location is closer to the second area than the first area of the second display; and
  in response to receiving the another adaptation parameter, modifying the customized user interface view by
  moving at least one of the user interface control elements of the second set of user interface control elements from a first location within the first area of the second display to a second location within the second area of the second display, where in the second location is closer to the user then the first location, while the content of the application is displayed on the first display and the second display and the location of the first set of user interface control elements on the first display remain unchanged; and
  displaying the modified customized user interface on the second display.

10. The computer storage device of claim 9, further comprising instructions that when executed by the processor perform a method further comprising generating the first and second user interface views based on properties of the first and second displays.

11. The computer storage device of claim 9, further comprising instructions that when executed by the processor perform a method further comprising modifying the first or second user interface view based on control directives received from the user.

12. The computer storage device of claim 9, wherein the second set of user interface elements comprises a modified user interface element of the first set of user interface elements.

13. The computer storage device of claim 9, wherein the adaptation parameter indicating the user's location is received from a location component, and wherein the location component determines the location of a user relative to the second display based on video information, audio information, or motion information.

14. An apparatus, comprising:
a processor;
multiple displays coupled to the processor; and
a memory coupled to the processor, the memory storing a custom user interface system that, when executed by the processor, is configured to adapt a user interface view of an application for presentation by one or more displays, the custom user interface system comprising:
a user interface adaptation component configured to receive as input a first user interface view of the application for presentation on a first display and an adaptation parameter, and
generate a second user interface view by customizing the first user interface view of the application on the first display based on the first user interface view for presentation on a second display based on the adaptation parameter,
wherein the first user interface view comprises a first set of user interface control elements and a content of the application, and
wherein the second user interface view comprises a second set of user interface control elements that are different from the first set of user interface control elements and the content of the application, where in the user interface control elements are enabled to control operations of the application; and
a presentation component configured to displaying the first user interface view of an application on a first display of a device,
detect a second display of the device, wherein the second display has a first area including a first side of the second display and a second area including a second side of the second display, where the first area and the second area of the second displayed do not overlap,
display the second user interface view on the second display of the device at a same time as presenting the first user interface view of the application on the first display of the device,
the presentation component further configured to receive another adaptation parameter indicating a user's location is closer to the second area than the first area of the second display, and
in response to receiving the another adaptation parameter, modifying the second user interface view by
moving at least one of the user interface control elements of the second set of user interface control elements from a first location within the first area of the second display to a second location within the second area of the second display, where in the second location is closer to the user then the first location, while the content of the application is displayed on the first display and the second display and the location of the first set of user interface control elements on the first display remain unchanged; and
displaying the modified second user interface on the second display.

15. The apparatus of claim 14, wherein generating the second user interface view further comprises modifying at least one user interface control element of the first set of user interface control elements.

16. The apparatus of claim 14, wherein the adaptation parameter represents a physical characteristic of the second display or a control directive of the user.

17. The apparatus of claim 14, wherein the custom user interface system further comprises a location component configured to determine the location of a user relative to the second display based on video information, audio information, or motion information.

18. The apparatus of claim 14, wherein the second display includes one or more additional input components.

* * * * *